United States Patent
Sawicki et al.

(10) Patent No.: US 10,663,679 B2
(45) Date of Patent: May 26, 2020

(54) ASSEMBLY TOOL AND OPTICAL FIBER CONNECTOR ASSEMBLY METHOD

(71) Applicant: Corning Research & Development Corporation, Corning, NY (US)

(72) Inventors: Joseph C. Sawicki, Austin, TX (US); Edward B. Lurie, Round Rock, TX (US); Lindsey K. Lewallen, Austin, TX (US); Victor J. Borer, Austin, TX (US); Joseph M. Van Allen, Cedar Park, TX (US)

(73) Assignee: Corning Research & Development Corporation, Corning, NY (US)

( * ) Notice: Subject to any disclaimer, the term of this patent is extended or adjusted under 35 U.S.C. 154(b) by 132 days.

(21) Appl. No.: 15/708,846

(22) Filed: Sep. 19, 2017

(65) Prior Publication Data

US 2018/0081130 A1 Mar. 22, 2018

Related U.S. Application Data

(60) Provisional application No. 62/397,165, filed on Sep. 20, 2016.

(51) Int. Cl.
*G02B 6/38* (2006.01)

(52) U.S. Cl.
CPC ......... *G02B 6/3898* (2013.01); *G02B 6/3849* (2013.01); *G02B 6/3893* (2013.01)

(58) Field of Classification Search
CPC .. G02B 6/3898; G02B 6/3887; G02B 6/3893; G02B 6/3846; G02B 6/3849
See application file for complete search history.

(56) References Cited

U.S. PATENT DOCUMENTS

| | | | |
|---|---|---|---|
| 4,986,626 A | 1/1991 | Bossard | |
| 5,040,867 A | 8/1991 | de Jong et al. | |
| 5,113,474 A | 5/1992 | Slaney et al. | |
| 5,408,558 A | 4/1995 | Fan | |
| 5,414,790 A | 5/1995 | Lee et al. | |
| 5,563,974 A | 10/1996 | Carpenter et al. | |
| 5,638,477 A | 6/1997 | Patterson et al. | |

(Continued)

FOREIGN PATENT DOCUMENTS

| | | |
|---|---|---|
| JP | 4544832 | 9/2010 |
| WO | 2010-120570 | 10/2010 |
| WO | 2012-012069 | 1/2012 |

OTHER PUBLICATIONS

Jones, Mechanism and Mechanical Movements, 186-189, (2015).

*Primary Examiner* — Ryan A Lepisto
*Assistant Examiner* — Erin D Chiem
(74) *Attorney, Agent, or Firm* — Grant A. Gildehaus

(57) ABSTRACT

An assembly tool for terminating an optical fiber with an optical fiber connector comprises a base having a connector cradle to hold said connector, a buffer clamp activation shuttle slideably disposed on the base to push a sleeve over a buffer clamp of the connector, and an activation mechanism pivotally mounted to the base. The activation mechanism includes an actuation lever to press a securing cap over a mechanical element in the connector, and a drive shaft coupled to the actuation lever. Moving the actuation lever from a first position to a second position activates the buffer clamp activation shuttle and presses the securing cap over the mechanical element.

22 Claims, 21 Drawing Sheets

(56) References Cited

U.S. PATENT DOCUMENTS

| | | |
|---|---|---|
| 5,812,718 A | 9/1998 | Carpenter et al. |
| 7,194,179 B1 | 3/2007 | Bryant et al. |
| 7,280,733 B2 | 10/2007 | Larson et al. |
| 7,346,255 B2 | 3/2008 | Yamaguchi et al. |
| 7,775,726 B2 | 8/2010 | Pepin et al. |
| 8,442,375 B2 | 5/2013 | Bylander et al. |
| 9,004,779 B2 | 4/2015 | Horibe et al. |
| 9,389,370 B2 | 7/2016 | Pratt et al. |
| 2014/0286611 A1* | 9/2014 | Pratt .................. G02B 6/3887 385/78 |
| 2014/0355936 A1 | 12/2014 | Bund et al. |
| 2015/0117822 A1 | 4/2015 | Hu et al. |

\* cited by examiner

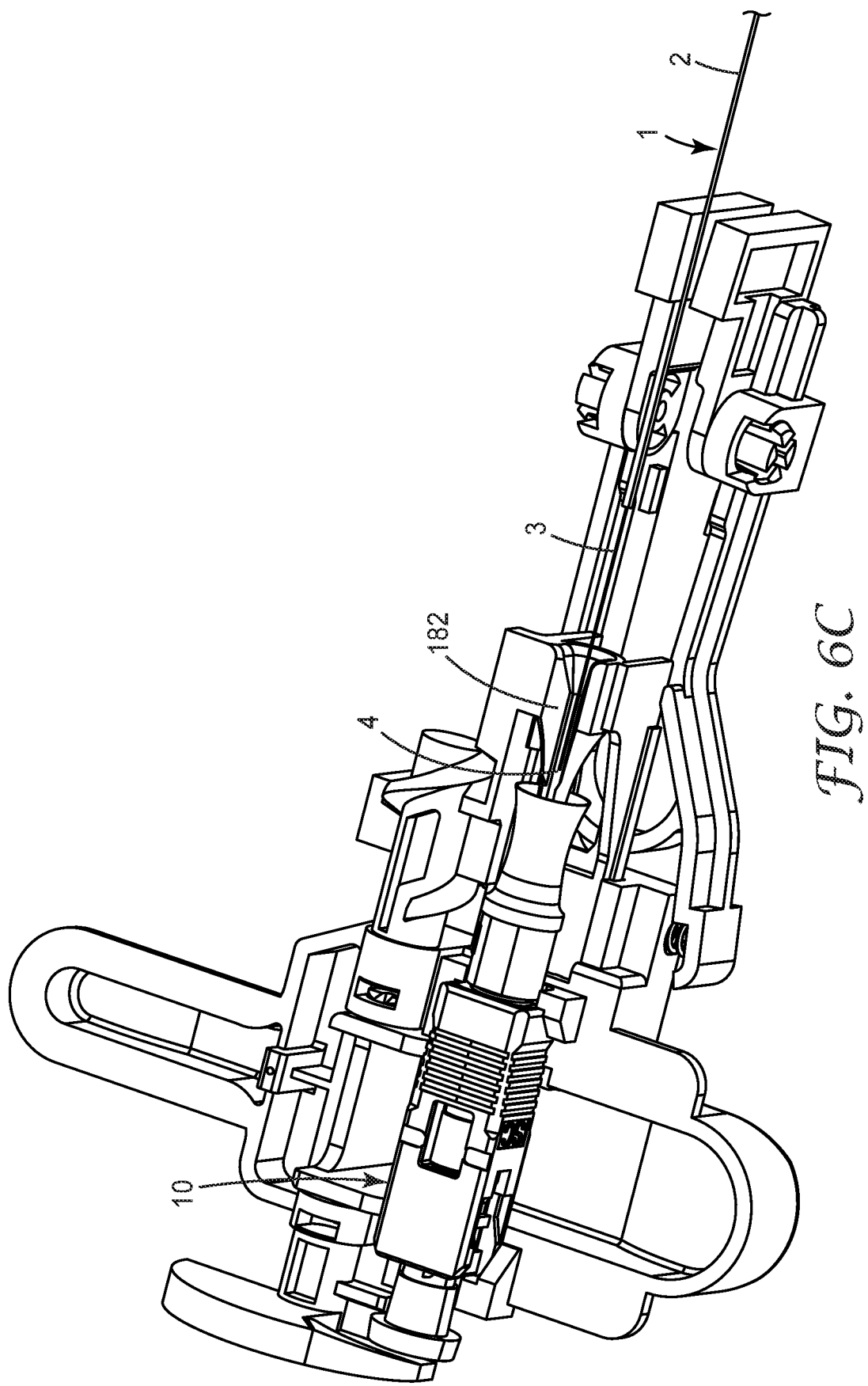

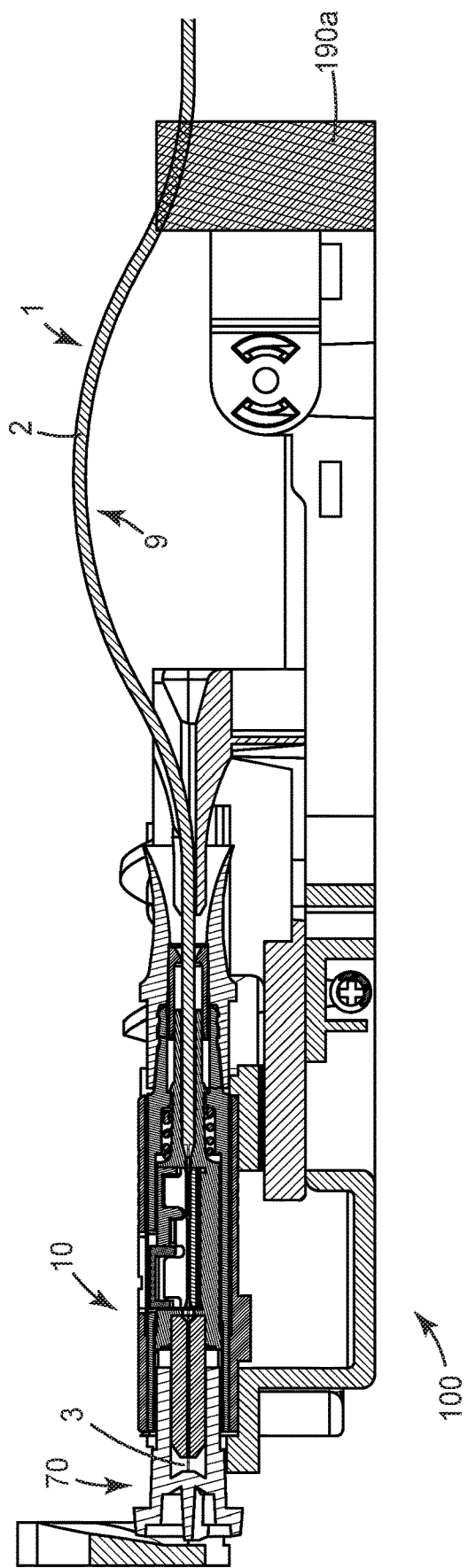

ASSEMBLY TOOL AND OPTICAL FIBER CONNECTOR ASSEMBLY METHOD

BACKGROUND OF THE INVENTION

Field of the Invention

The present invention is directed to an apparatus and method for assembling remote grip ferrule-based optical fiber connectors.

Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the end face of the ferrule by adhesively securing the fiber within the bore of the ferrule. A second class of connectors includes non-ferrule connectors, which rely on the buckling of a length of fiber to create contact pressure when mated to another connector or to a connector receptacle. Another class of connectors includes remote grip (ferruled) connectors, where the fiber is secured at some distance away from the terminal end or tip of the fiber.

When installing a remote grip connector in the field, one current practice uses a coplanar/flush polish which is done after the fiber is secured within an optical fiber connector. In remote grip connectors, as with other connector types, low optical losses and minimal reflections are achieved when the terminal ends of at least two optical fibers make secure physical contact. However, any differences in the coefficient of expansion between the fiber, the ferrule, etc. within the assembly may result in a non-contacting fiber tip when the temperature is raised or lowered. The resulting gap can lead to poor insertion loss and significant back reflection. Conventional remote grip connectors are described in U.S. Pat. Nos. 5,408,558 and 7,775,726.

Another current practice involves a technician performing a field polish to create a fiber terminal end which protrudes slightly beyond the ferrule tip (i.e. the protrusion length of the fiber). This method of polishing remote grip connectors can produce a range of protrusion lengths that can provide a secure physical contact while avoiding excess force on the fiber tips.

Independent of whether using a flush polish, a protruding polish, or no polish, it is beneficial to secure the fiber so that the fiber tip protrudes a known amount. In the case where the fiber is polished after insertion, setting the protrusion and securing the optical fiber in the optical fiber connector, the amount of polishing needed can be minimized. In the case where no final polishing is done to the fiber, the protrusion setting step of the assembly process defines the final protrusion of the fiber from the end face of the connector ferrule. For example, a method of setting fiber protrusion is described in U.S. Pat. No. 7,194,179 and U.S. Patent Publication No. 2010/0316344.

Before inserting the fiber into a connector, the fiber is typically stripped and cleaved. Removing of any jacket material from the fiber optic cable and stripping away the buffer coating exposes the bare glass fiber which can then be fitted through a standard fiber optic connector ferrule. Cleaving provides an end face that can be nearly perpendicular to the axis of the fiber and reduces the amount of polishing required. In some applications, an angle cleave (e.g. of less than about 10°) can be used to improve the performance of the optical fiber connector. An appropriate cleave length (the distance between the fiber tip and the end of the polymer coating) is necessary to ensure that a sufficient amount of fiber can extend beyond the tip of the ferrule.

More recently, efforts have been made to simplify the installation procedures and tools used to field install remote grip optical fiber connectors. In spite of these improvements, mistakes in the installing these connectors are still made by the craft that can result in breaking of the optical fiber during installation, or reduced reliability and/or signal performance after installation. As a result, service and network providers as well as their contractors would like to reduce the training time required and simplify the installation process for this class of field-mount connectors. In addition, it would improve the field technician's efficiency if there was a single installation tool that could be used with more than one specific type of optical fiber connectors as well as being usable with the wide variety of optical fiber cables encountered in the field.

Thus, there is a need for an installation assembly tool and process for installing optical fiber connectors that is simpler and more straightforward to use and that can be used with a wider variety of optical fiber connector types and optical fiber cables.

SUMMARY OF THE INVENTION

According to an exemplary embodiment of the present invention, an assembly tool for terminating an optical fiber with an optical fiber connector is described. The assembly tool comprises a base having a connector cradle disposed near a first end thereof to hold the optical fiber connector while the optical fiber is terminated by the assembly tool, a buffer clamp activation shuttle slideably disposed on the base, wherein the buffer clamp activation shuttle is configured to push a sleeve over a buffer clamp of the fiber optic connector, wherein the buffer clamp is configured to clamp onto a buffer portion of the optical fiber, and an activation mechanism. The activation mechanism is pivotally mounted to the base and includes an actuation lever to press a securing cap over a splice mechanical element disposed within the optical fiber connector, and a drive shaft coupled to the actuation lever. Moving the actuation lever from a first position to a second position in a single movement moves the buffer clamp activation shuttle to activate the buffer clamp and the actuation lever presses the securing cap over the mechanical element. The mechanical element can be a mechanical splice element or a mechanical gripping element.

In a second embodiment, an assembly tool for terminating an optical fiber with an optical fiber connector is described. The assembly tool comprises a base having a connector cradle disposed near a first end thereof to hold the optical fiber connector while the optical fiber while being terminated by the assembly tool, a buffer clamp activation shuttle slideably disposed on the base, wherein the buffer clamp activation shuttle is configured to push a sleeve over a buffer clamp of the fiber optic connector, wherein the buffer clamp is configured to clamp onto a buffer portion of the optical fiber, and an activation mechanism. The activation mechanism is pivotally mounted to the base and includes a protrusion setting cam to set a protrusion of a terminal end of the optical fiber, the protrusion corresponding to a distance that the terminal end of the optical fiber extends from an end face of the connector ferrule, an actuation lever to press a securing cap over a mechanical element disposed within the optical fiber connector, and a drive shaft coupled to the actuation lever. All of which are activated in in a single continuous movement of the actuation lever from a first position to a second position.

In a third embodiment, a method of terminating an optical fiber with an optical fiber connector having a first end that includes a ferrule and a second end. An assembly tool is provided that comprises a base having a connector cradle disposed near a first end thereof; and an activation mechanism having an activation lever to press a securing cap over a splice element within the optical fiber connector, and a drive shaft to slideably move a buffer clamp activation shuttle to push a sleeve over a buffer clamp of the fiber optic connector. The method comprises the steps of inserting an optical fiber connector into the connector cradle, inserting a prepared optical fiber into the second end of the optical fiber connector until a portion of the fiber outside of the connector begins to bow, and moving the actuation lever from a first position to a second position to move the buffer clamp activation shuttle to actuate the buffer clamp and to press the securing cap over the splice element within the optical fiber connector.

BRIEF DESCRIPTION OF THE DRAWINGS

The present invention will be further described with reference to the accompanying drawings, wherein:

FIGS. 6A-6F illustrate how the exemplary assembly tool is used to terminate an optical fiber with an optical fiber connector.

FIG. 7 is a cross-sectional view of an assembly tool being used to terminate an optical fiber with an optical fiber connector after the optical fiber has been inserted into the optical connector.

Figure 1:
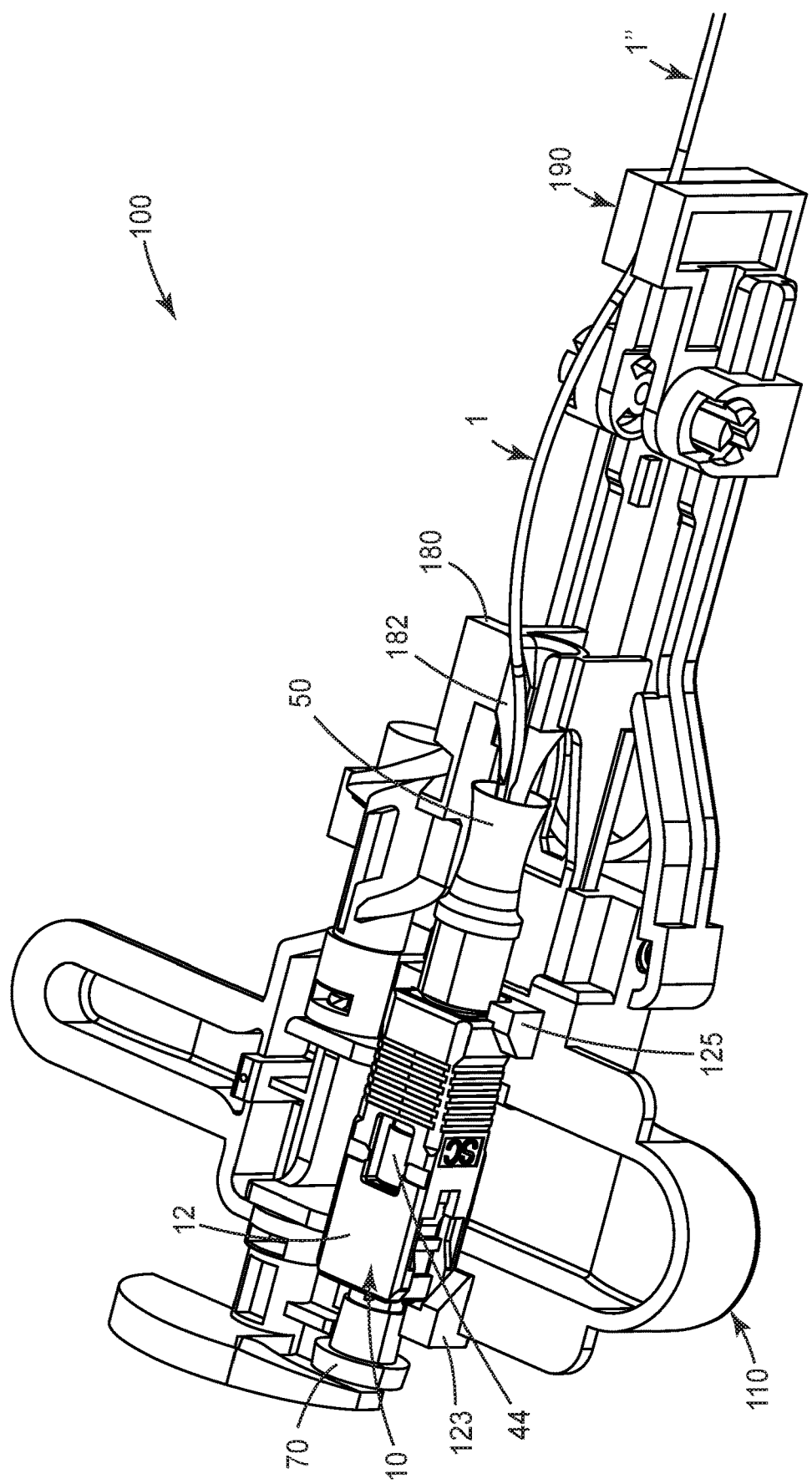
FIG. 1 shows an isometric view of an assembly tool being used to terminate an optical fiber with an optical fiber connector according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to an exemplary assembly tool 100 and method of installing an optical fiber 1 in an optical fiber connector 10 as shown in FIG. 1, where the optical fiber is set to a predetermined fiber protrusion. Setting the amount of the fiber protruding from the end face of the connector ferrule can minimize and simplify or eliminate the final polishing step in the fiber optic connector installation process. The exemplary assembly tool of the present invention eliminates the need for the field technician to remember a specific long series of steps to terminate an optical fiber connector. In essence the exemplary process has been boiled down to four easy steps: put the connector in the tool, prepare the fiber, insert the fiber and flip the activation lever. The exemplary assembly tool ensures that all of the sub-processes/movements are done in order, the same way every time.

The exemplary tool provides a visual confirmation that connector is being terminated correctly. By "watching for bow lift", it is estimated that as many as about 95% of common installation mistakes can be avoided. The exemplary tool not only can move the dust cap in order to set the correct fiber protrusion setting tasks, but also actuate a mechanical gripping element and insert buffer clamping ring into the second end of the optical fiber connector. The exemplary assembly tool can be used to install an optical fiber connector onto optical fiber 1, wherein the optical fiber can be a 250 μm fiber, a 900 μm fiber, round or oval optical fiber drop cables having up to 6 mm in diameter, or rectangular optical fiber drop cables having a maximum dimension of 8.3 mm. It will be understood that the terms optical fiber may be genericized to refer not only to 250 μm fiber, a 900 μm fiber but also to optical fiber cables which can be terminated with this exemplary tool.

In addition, the exemplary tool can be used to terminate an optical fiber a fully assembled optical fiber connector, a partially assembled connector where the strain relief boot is positioned after termination or an optical fiber backbone without the outer shell installed.

Figure 2A:
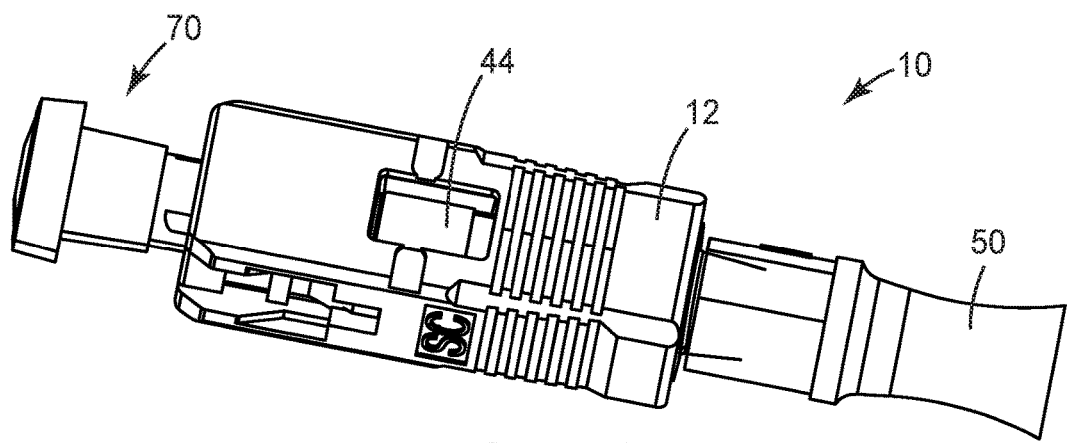
FIGS. 2A and 2B are two views of an exemplary connector that can be terminated with the exemplary assembly tool of FIG. 1.
Figure 2B:
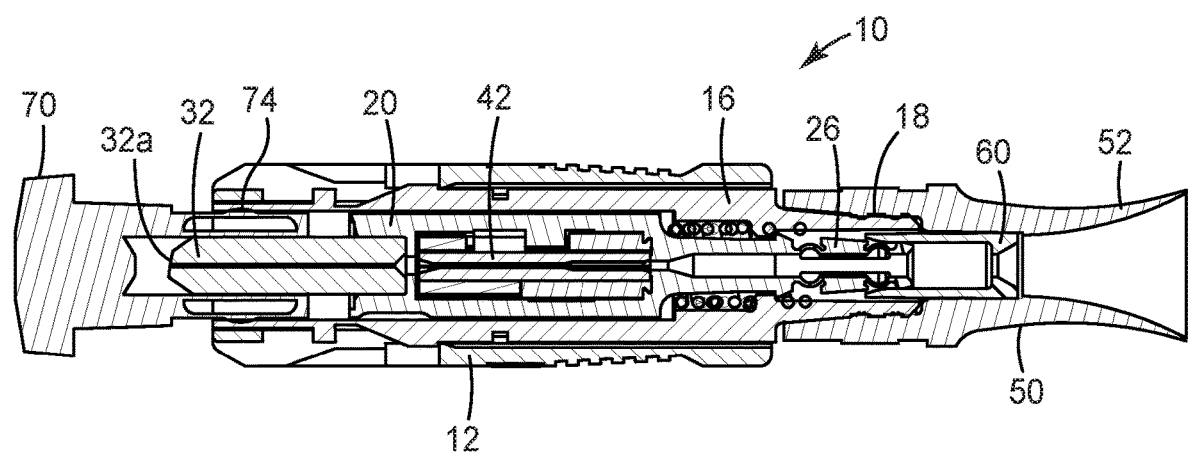

For example, optical fiber connector 10 can be a fully assembled remote grip connector as shown in FIGS. 1 and 2A-2B. Such a connector is described in detail in U.S. Pat. No. 7,775,726, incorporated by reference herein in its entirety. In alternative aspects, the conventional connector 10 can include a Crimplok™ Connector available from 3M Company (St. Paul, Minn.). In an exemplary aspect, optical fiber connector 10 can have an SC format. In other aspects, the protrusion setting apparatus can be configured to receive a connector having another standard connector format, such as an LC format or an FC format.

The exemplary optical fiber connector 10 can include a connector body having an outer shell 12 that is configured to be received in an SC receptacle (e.g., an SC coupling, an SC adapter, or an SC socket) and a fiber strain relief boot 50. A backbone 16 can be disposed inside the outer shell 12 and can provide structural support for the optical fiber connector 10. The backbone 16 further includes at least one access opening to provide access to actuate a gripping device disposed within the connector and a mounting structure 18 for attaching fiber strain relief boot 50 to the optical connector. In an exemplary aspect, boot 50 includes a funnel-shaped tail section 52 to and can be pre-mounted on the optical connector.

Additionally, connector 10 includes a collar body 20 that is disposed within the connector/s outer shell and retained therein. The collar body 20 can house a gripping/mechanical device that secures the bare glass portion of the optical fiber within connector 10 and a fiber buffer clamp 26 that clamps onto a buffer portion of the optical fiber. A sleeve 60 having an opening extending therethrough can be axially slid over the outer surface of buffer clamp 26 during installation of the connector onto an optical fiber to activate the buffer clamp. The funnel-shaped tail section 52 of boot 50 allows the exemplary assembly tool access to sleeve 60 so that it can be slid over the buffer clamp.

The gripping device includes a gripping element 42 and a securing cap 44 and can be seated within collar body 20. In a preferred aspect, the gripping element 42 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum. Securing cap 44 is preferably configured to engage the gripping element 42 such that the gripping element securely grabs a fiber inserted therein when the securing cap is fully actuated over the gripping element. In operation, the securing cap 44 is moved from an open position to a closed position when pressed down over the gripping element.

Structurally, a connector ferrule 32 may be secured in one end of collar body 20 by any known method (e.g. adhesive, snap fit, etc.). Connector ferrule 32 can be formed from a ceramic, glass, plastic, or metal material to support the optical fiber being inserted and terminated within the optical connector. In a first exemplary aspect, connector ferrule 32 is a ceramic ferrule.

Optical fiber connector 10 can further includes a protrusion setting dust cap 70 disposed over a connector ferrule at the first end of the connector to protect the connector ferrule 32 (see FIG. 2B) when not in use. Dust cap 70 also provides a protrusion setting mechanism for use during the field termination process using the exemplary assembly tool described herein.

Figure 3A:
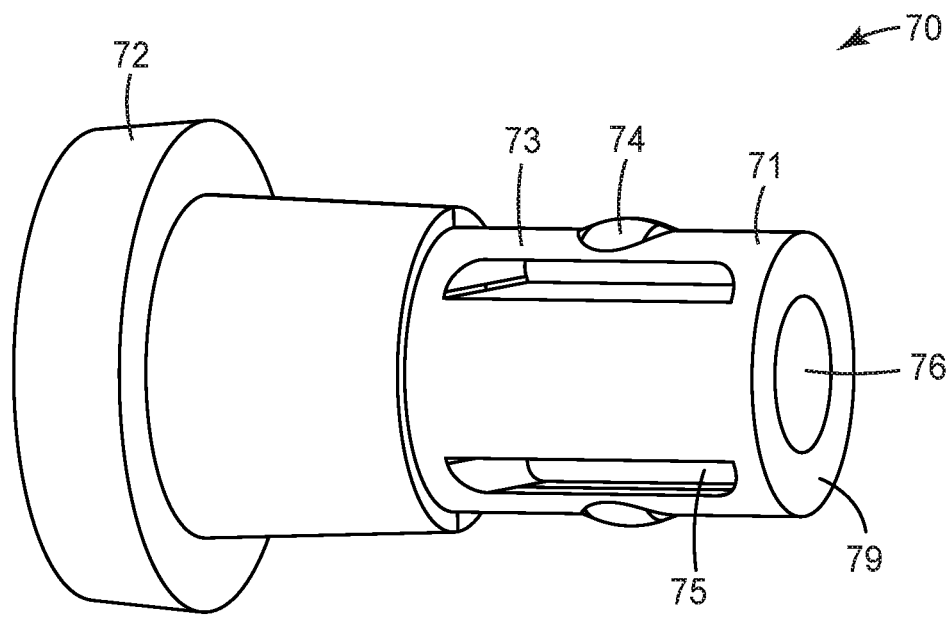
FIGS. 3A and 3B are two views protrusion setting dust cap of the connector of FIGS. 2A and 2B.
Figure 3B:
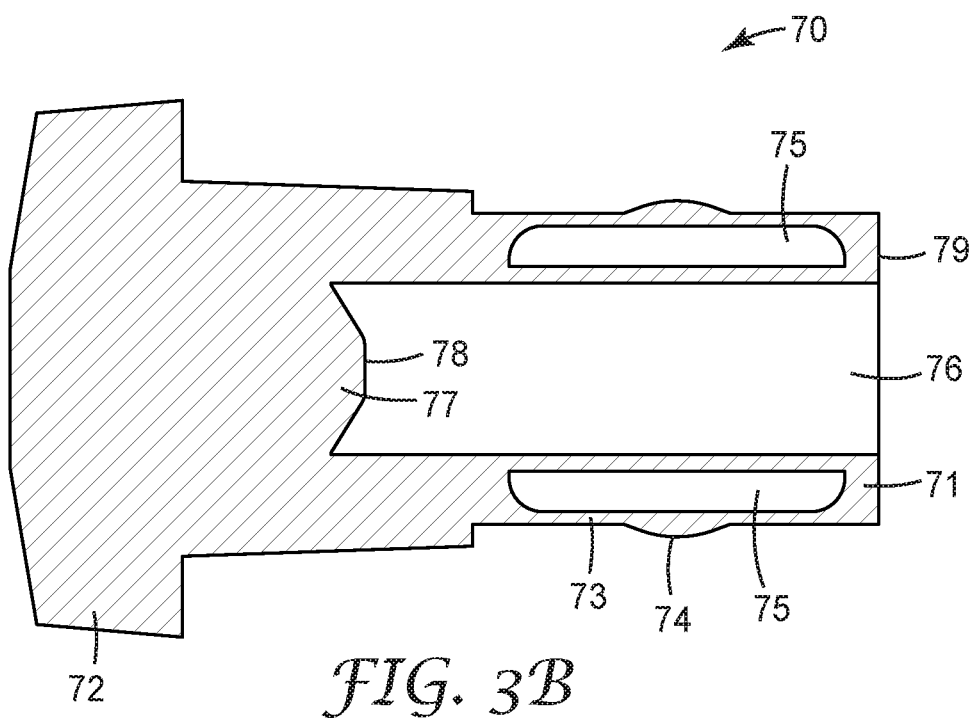

Referring to FIGS. 2B, 3A and 3B, dust cap 70 has a generally cylindrical body 71 with a cylindrical bore 76 formed therein and extending partially through the dust cap and a larger lid portion 72 formed at the end of the dust cap opposite the bore. The cylindrical profile of the cap body is designed to be slightly smaller than the opening in the backbone 16 of connector 10 through which ferrule 32 extends. In one aspect, the dust cap can include a cut away portion 75 having one or more beams 73 extending across and spaced apart from the surface of the cut away portion at a center portion of the beam and attached to the edges of the cut away portion at the ends of the beam. The outer surface of the beams forms a portion of the cylindrical profile of the cap body. Each beam can include a friction bump 74 disposed on the outer surface of each beam. The friction bumps extend beyond the cylindrical profile of the cap body and will result in a friction force when the dust cap is installed over the ferrule. The beams on which the frictional bumps are located flex inward as the cap is inserted, thus maintain the friction force. The cap is initially installed so that the friction bumps just enter the open end of backbone 16 to endure that the end 77 of the bore does not contact the end face 32a of the ferrule. In one aspect, the end of the bore can be from about 1-3 mm away from the end of the ferrule when it is initially installed over the ferrule of the connector.

FIG. 3B is a cross section of dust cap 70 showing the interior of bore 76. The end of the bore can have the shape of a truncated cone having an exposed face 78. Exposed face 78 can be disposed parallel to the end 79 of the cap body or can be disposed a slight angle face with respect to the cap body. During the termination process, the bare glass portion of the optical fiber is inserted through the ferrule until it contacts the end 77 of the bore and then the cap is pushed further into the open end of the backbone so that a terminal end of the optical fiber extend from an end face of the connector ferrule by a prescribed amount (e.g. between about 8 microns and about 42 microns).

Assembly tool 100 includes a base 110 having a first end 110a and a second end 110b. Base 110 includes a connector cradle 120 disposed near a first end thereof to hold the optical fiber connector during the termination of an optical fiber, a buffer clamp actuation section 105 disposed adjacent to the connector cradle and a pair of flexible spring arms 130 extending from the buffer clamp actuation section opposite the connector cradle. In an exemplary aspect, the exemplary assembly tool can be placed on a flat work surface during use, while in another aspect the exemplary assembly tool is configured to be held in the hand during use.

Connector cradle 120 positions and holds an optical fiber connector during the process of mounting or installing the connector on the terminal end of an optical fiber. In particular, the connector cradle has one or more frame portions 123, 125 extending from a level platform 122, 124 on the base. For example, assembly tool has a front frame portion 123 on one side of the connector cradle and a rear frame portion 125 on a second side of the connector cradle that at least partially surround the front and rear sides of the connector's outer shell as shown in FIG. 1. The front fame portion 123 can include a semicircular notch 126 formed therein to support the dust cap 70 of connector 10 housings.

Buffer clamp actuation section 105 is configured to accept a buffer clamp activation shuttle 180 so that can slide with respect to the base. In particular, the buffer clamp actuation section 105 includes a track 108 on each side thereof to accommodate rails 186 disposed on either side of the buffer clamp activation shuttle's stage 185. In an exemplary aspect, the buffer clamp actuation section can be recessed with respect to the level platform 122, 124 of connector cradles to allow the buffer clamp activation shuttle's stage to slide back and forth beneath the connector cradle without disturbing the positioning of the cradle.

Buffer clamp activation shuttle 180 can further include a funnel shaped fiber guide 182 disposed on top of the stage. The funnel shaped fiber guide facilitates insertion of the bare glass portion of the optical fiber into the second end of the connector and actuates buffer clamp 26 of connector 10 by pushing sleeve 60 over the buffer clamp when the shuttle moves forward with respect to the connector cradle during the termination process. For example, funnel-shaped fiber guide 182 has a tip portion 181 configured to contact the end of sleeve 60, or a portion thereof.

Buffer clamp activation shuttle 180 also includes a drive block 187 having semicircular depression 183 formed in the top surface thereof to support one end of the drive shaft 150. A helical trench 188 is formed in the surface of the depression to accommodate thread 154 extending from the surface of the drive shaft. The buffer clamp activation shuttle will move as the drive shaft turns bringing the buffer clamp activation shuttle closer to the connector cradle when the activation mechanism 140 rotate from a first position shown in FIG. 1 to a second position shown in FIG. 6F. The buffer clamp activation shuttle will move away from the connector cradle when the activation mechanism 140 rotate from a second position to a first position.

Figure 4A:
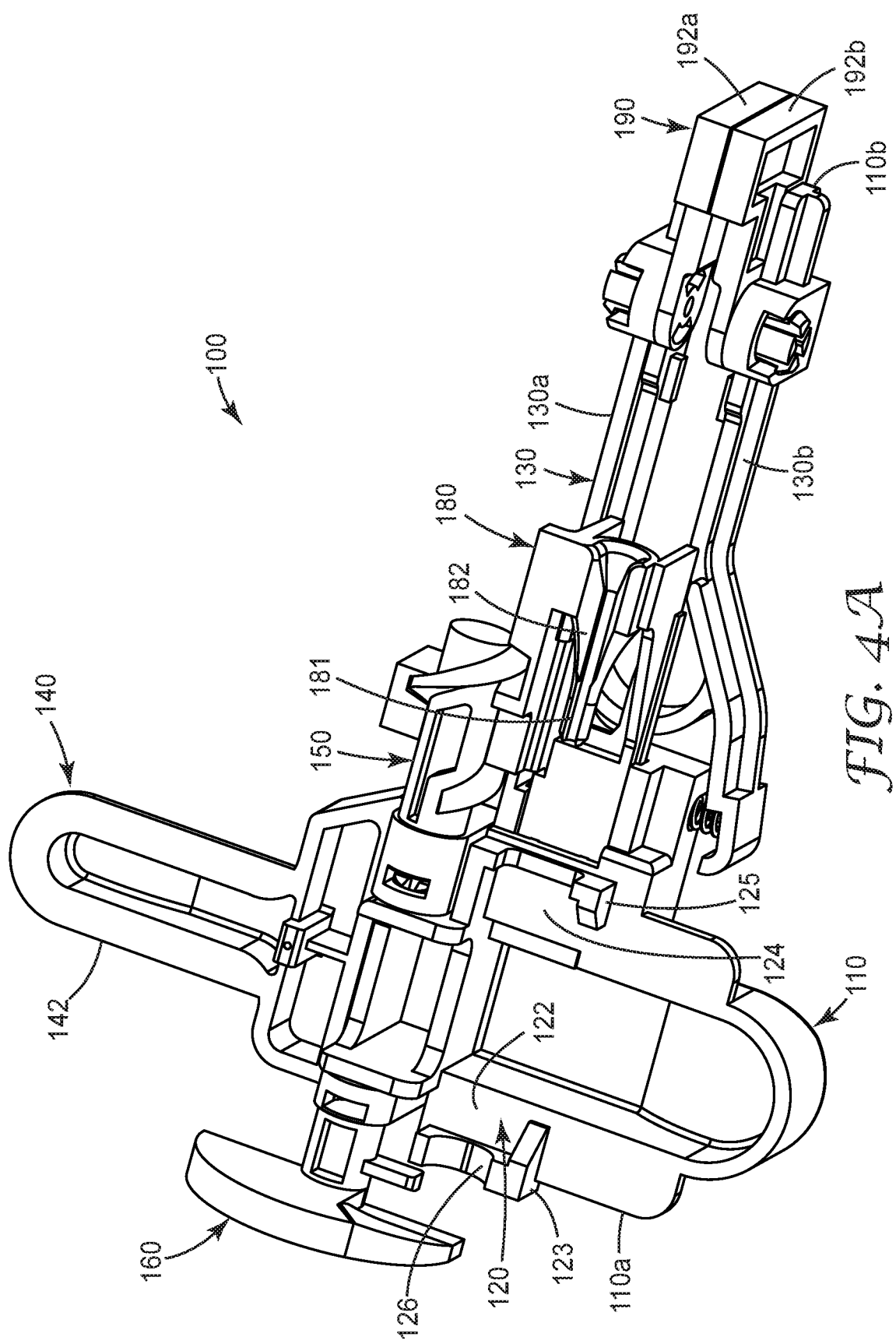
FIGS. 4A-4E are five additional views of an assembly tool according to an exemplary embodiment of the present invention.
Figure 4B:
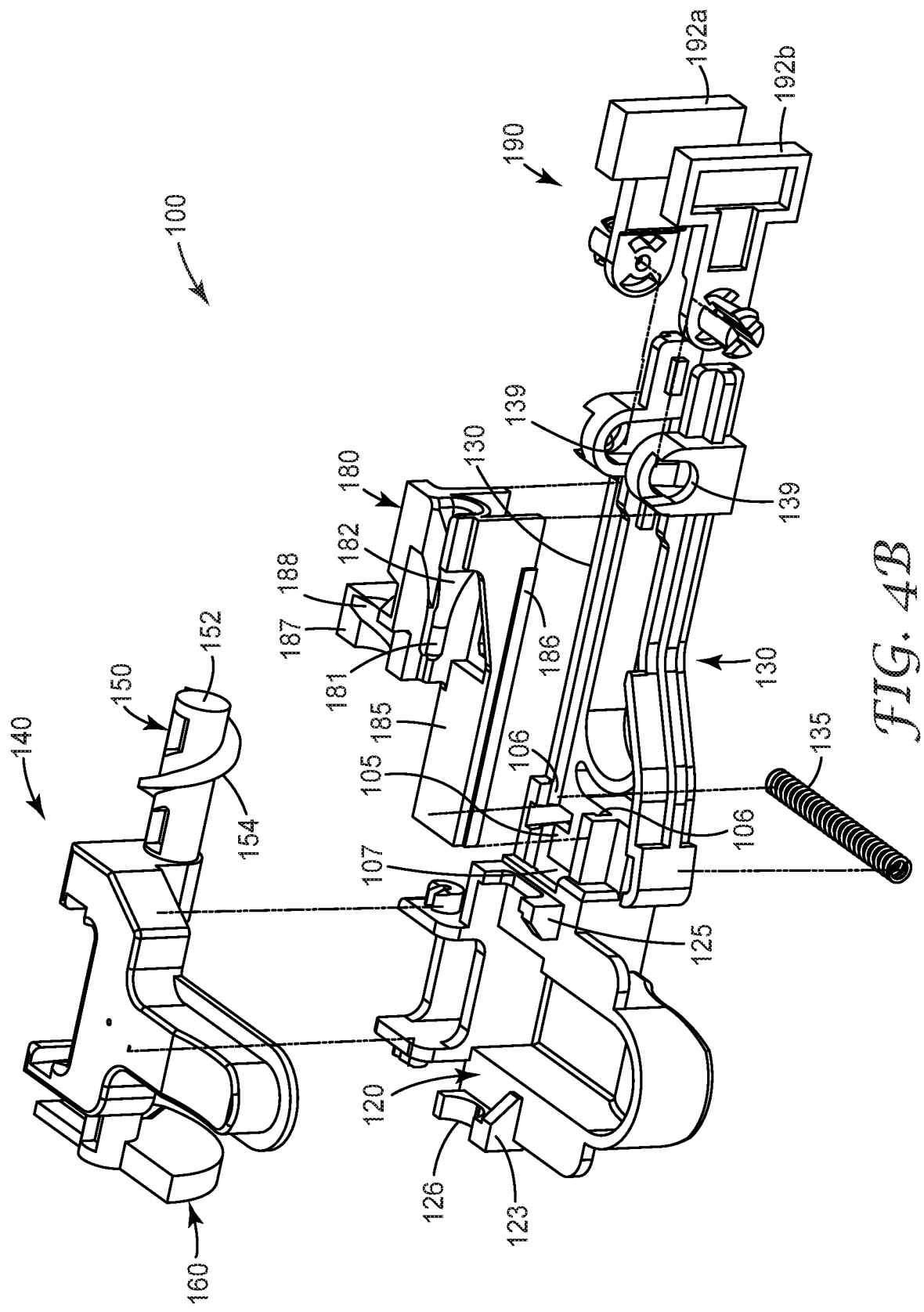
Figure 4C:
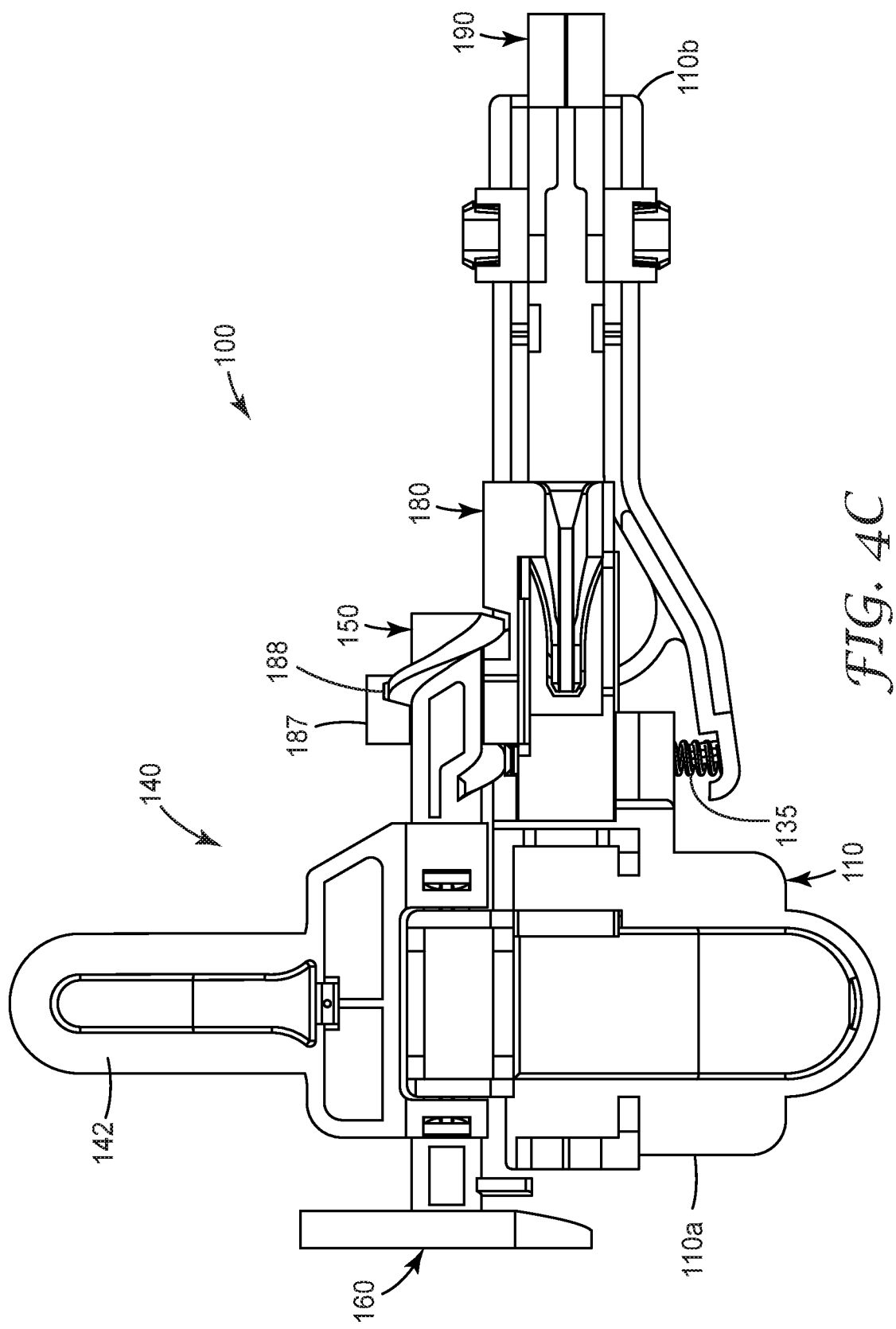
Figure 4D:
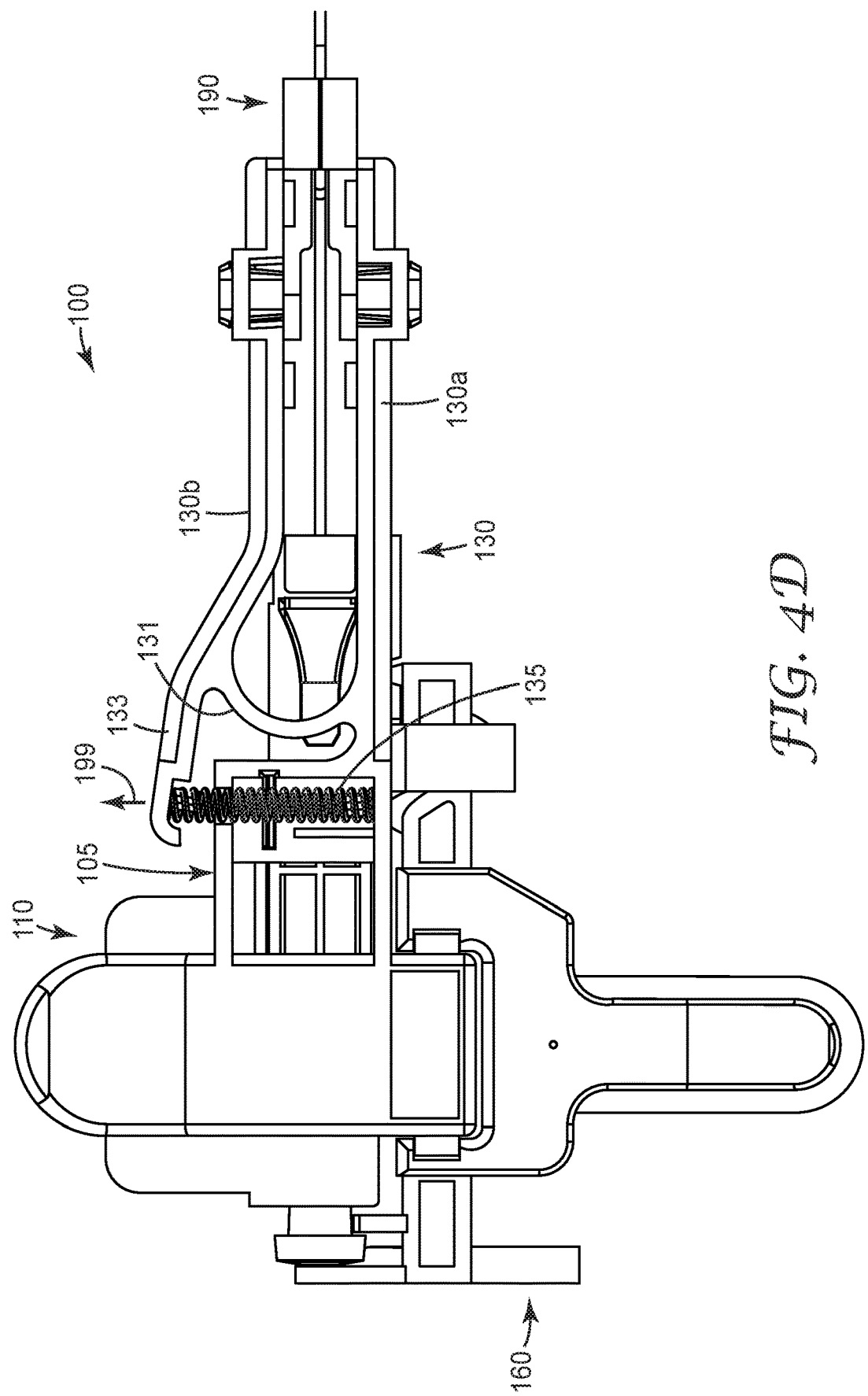
Figure 4E:
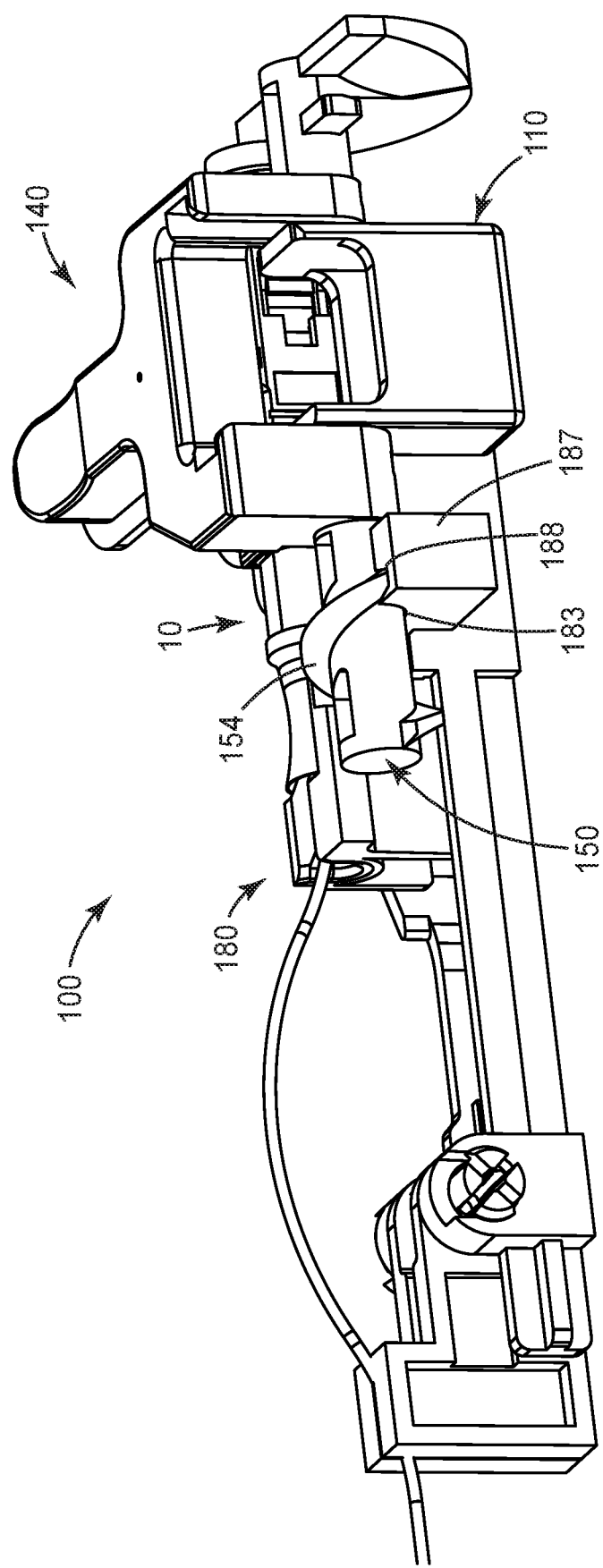
Figure 5A:
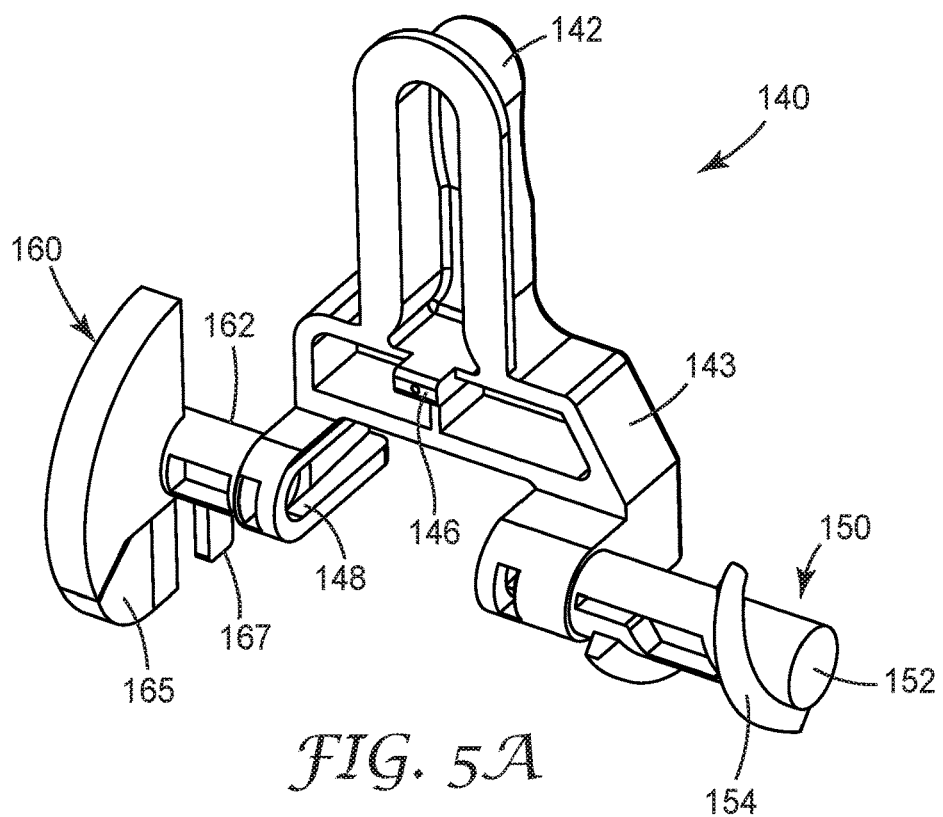
FIGS. 5A and 5B are two views of an activation mechanism of the exemplary assembly tool of FIGS. 1 and 5A-5B.
Figure 5B:
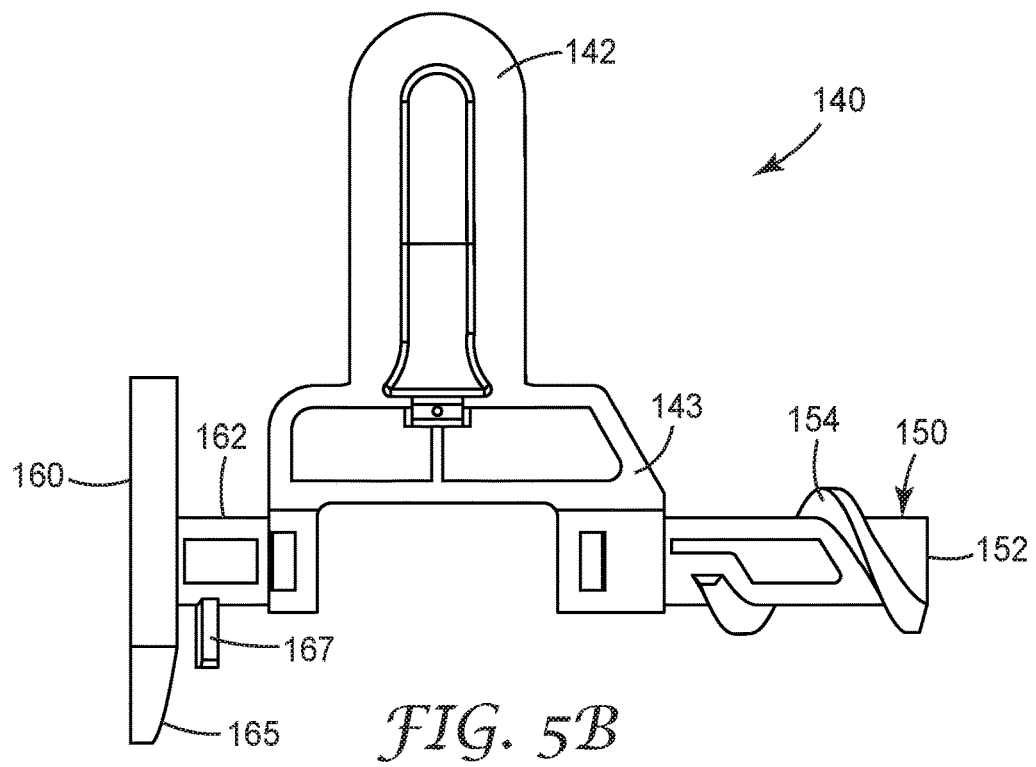

Flexible spring arms 130 extend from the buffer clamp actuation section opposite the connector cradle, best shown in FIG. 4D. The flexible spring arms include a primary arm 130a which is attached to the buffer clamp actuation section 105 at one end and extends away from the buffer clamp actuation section to a free end. A secondary arm 130b is connected to the primary arm by a resilient loop at a connection point 132. The secondary arm extends from the connection point in a first direction to its free end. A clamp lever 133 connect extends from the connection point in a second direction. A compression spring 135 can be connected to the free end of the lever arm to push the end of the clamp lever away from primary arm 130a as indicated by directional arrow 199. This action pushes the free end of the secondary arm toward the free end of the primary arm. The free ends of the primary and secondary arms can be moved apart by applying pressure to the free end of the clamp lever in a direction opposite directional arrow 199 compressing compression spring 135. In other words, the clamp lever is spring loaded in a closed position, wherein the clamping lever is depressed to open the clamping plates.

Figure 10:
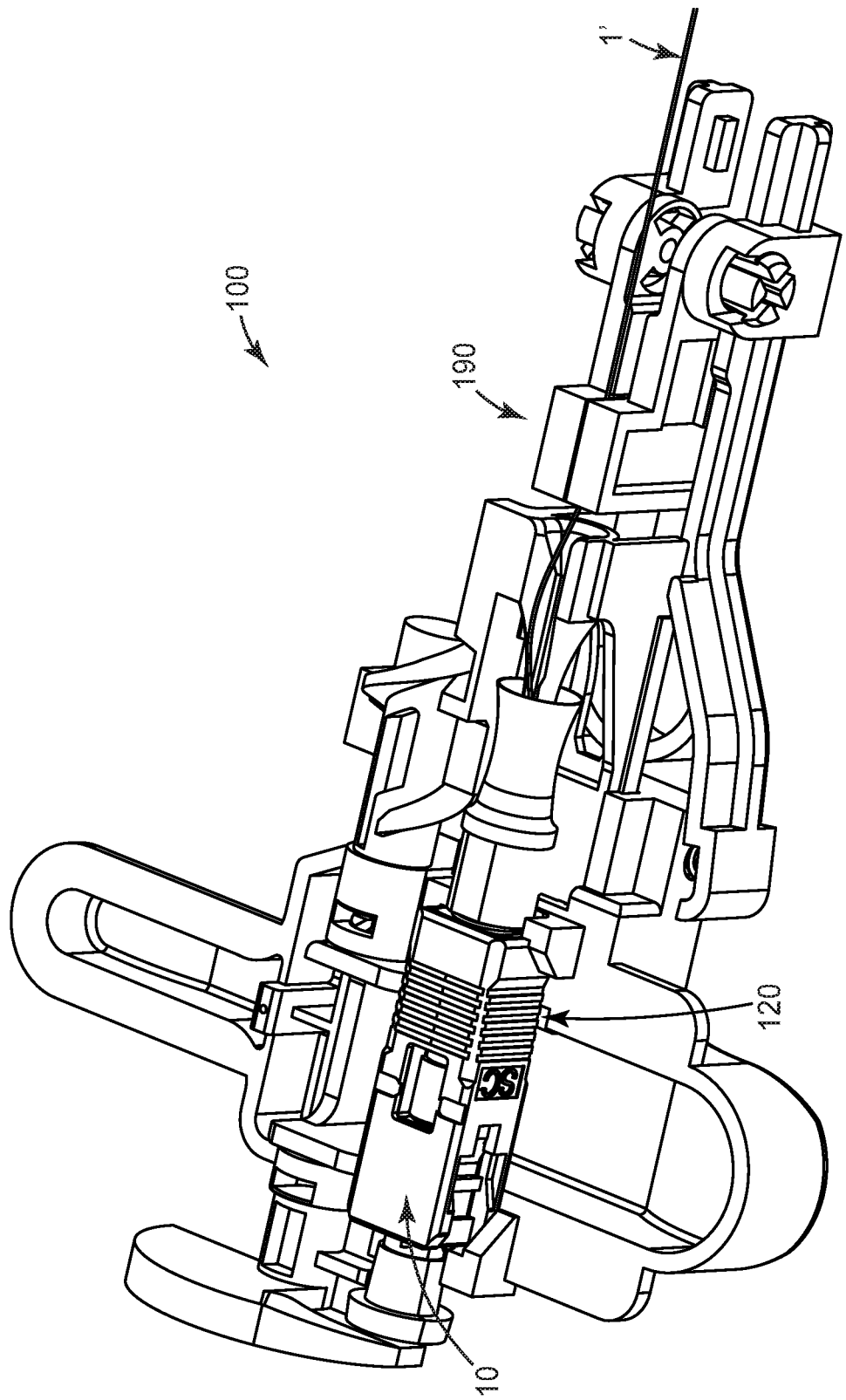
FIG. 10 is an isometric view of an assembly tool being used to terminate a 250 micron optical fiber with an optical fiber connector according to an exemplary embodiment of the present invention.

Both the primary arm 130a and the secondary arm 130b have an open socket 139 formed adjacent to their free ends. A clamping plate 192 can be attached to each arm using the open socket to form an optical fiber clamp 190. In one aspect, optical fiber clamp is rotatably connected to the base about an axis that is perpendicular to the optical fiber while being terminated by the assembly tool. In this way the clamp can be disposed closer to the connector cradle when the optical fiber being terminated is a 250 micron optical fiber 1' as shown in FIG. 10 or can be moved further away from the connector cradle when terminating 900 micron optical fiber 1" shown in FIG. 1 or optical fiber drop cables 1''' shown in FIG. 11.

In an alternative aspect, optical fiber clamp 190 is removably attached to the base to allow replacement of one style of clamp with another style or clamp or to replace worn clamping plates.

Assembly tool 100 further includes an activation mechanism 140 pivotally mounted to the base near the connector cradles. The activation mechanism includes an actuation lever 142 and a drive shaft attached to the actuation lever at a first end of the drive shaft. The actuation lever is configured to contact and press against the securing cap of the connector, such as securing cap 44 of the remote grip optical fiber connector 10 (see FIG. 1) when the actuation lever is moved from a first position to a second position. The actuation lever can have a force concentrator 146 on its bottom side. It is the force concentrator that actually contacts the securing cap of the connector and pushes it down over the mechanical gripping element.

Connection receptacles 148 of actuation lever 140 can be rotatably attached to pegs 116 extending from mount 116 of base 110 so that the actuation lever rotates from a first position to a second position. The actuation lever rotates around an axis parallel to the optical fiber while it is being terminated by assembly tool 100.

As mentioned previously, the drive shaft has an external thread that is configured to fit in helical trench 188 in drive block 187 of buffer clamp activation shuttle 180 to move the buffer clamp activation shuttle relative to the base.

In one aspect, the sleeve 60 pushed onto the buffer clamp 26 by the buffer clamp activation shuttle 180 before the securing cap 44 is pressed over the mechanical element by the actuation lever. Alternatively, the securing cap is pressed before the sleeve pushed onto the buffer clamp.

The activation mechanism 140 can optionally include a protrusion setting cam 160 to set a protrusion of a terminal end of the optical fiber, wherein the protrusion corresponds to a length or distance that the terminal end of the optical fiber extends from an end face of the connector ferrule. The protrusion setting cam can be attached to the actuation lever by a spacer rod 162 opposite where the drive shaft connects to the actuation lever. The protrusion setting cam can have a plate-like shape having an inclined surface 165 that is configured to move the protrusion setting dust cap 70 when the actuation lever is moved from a first position to a second position.

Protrusion setting cam 160 can further include a cap stop 167 to prevent premature movement of the protrusion setting dust cap during insertion of the optical fiber into connector 10.

The protrusion setting cam is activated by the movement of the actuation lever. In one aspect, protrusion setting cam is activated prior to the sleeve being pushed onto the buffer clamp and the securing cap is being pressed over the mechanical element. In an exemplary aspect, the protrusion of the optical fiber from the end face of the ferrule, the buffer clamp actuated and the securing element depressed can be accomplished sequentially by a single movement of the actuation lever from a first position to a second position.

Figure 6A:
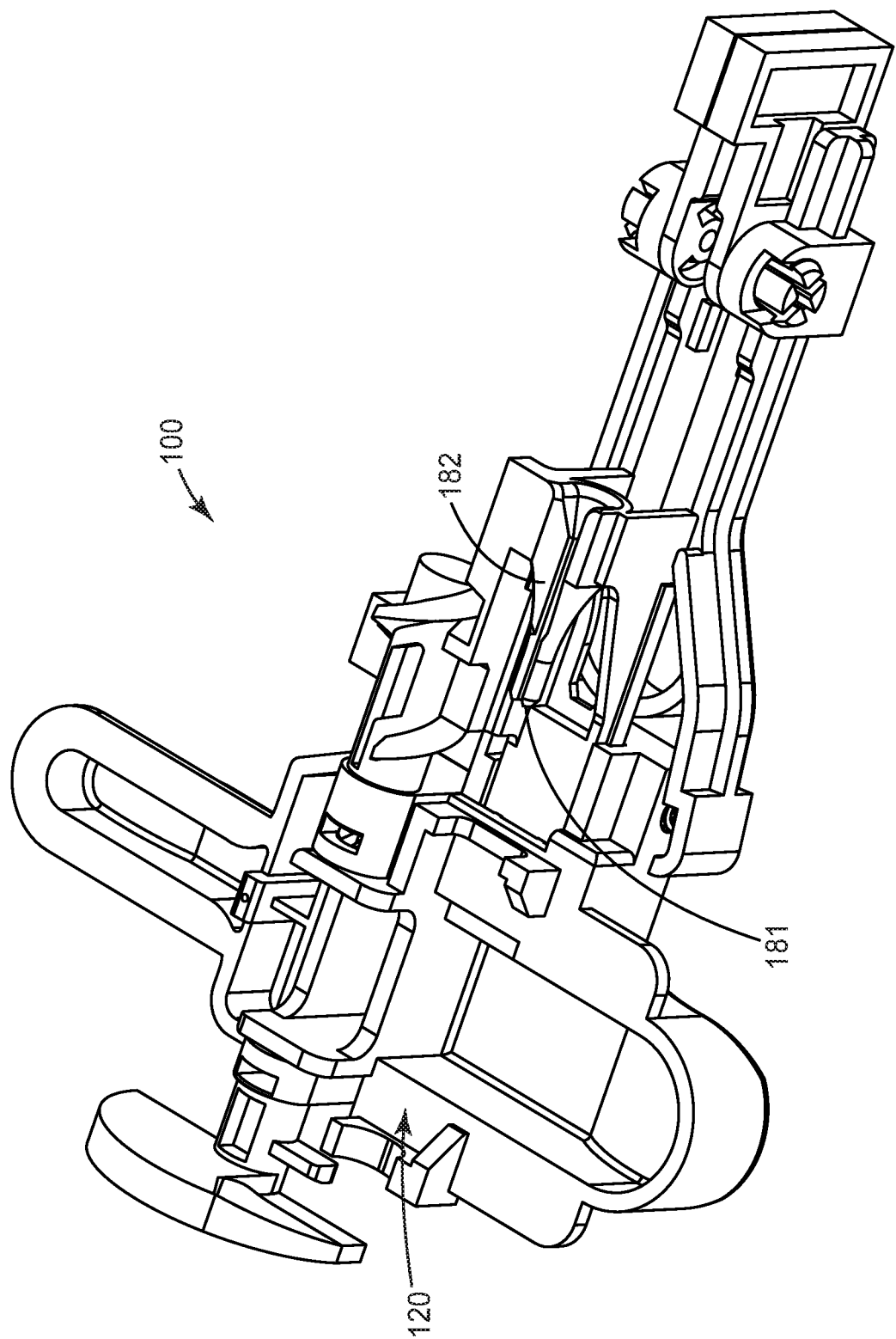
Figure 6B:
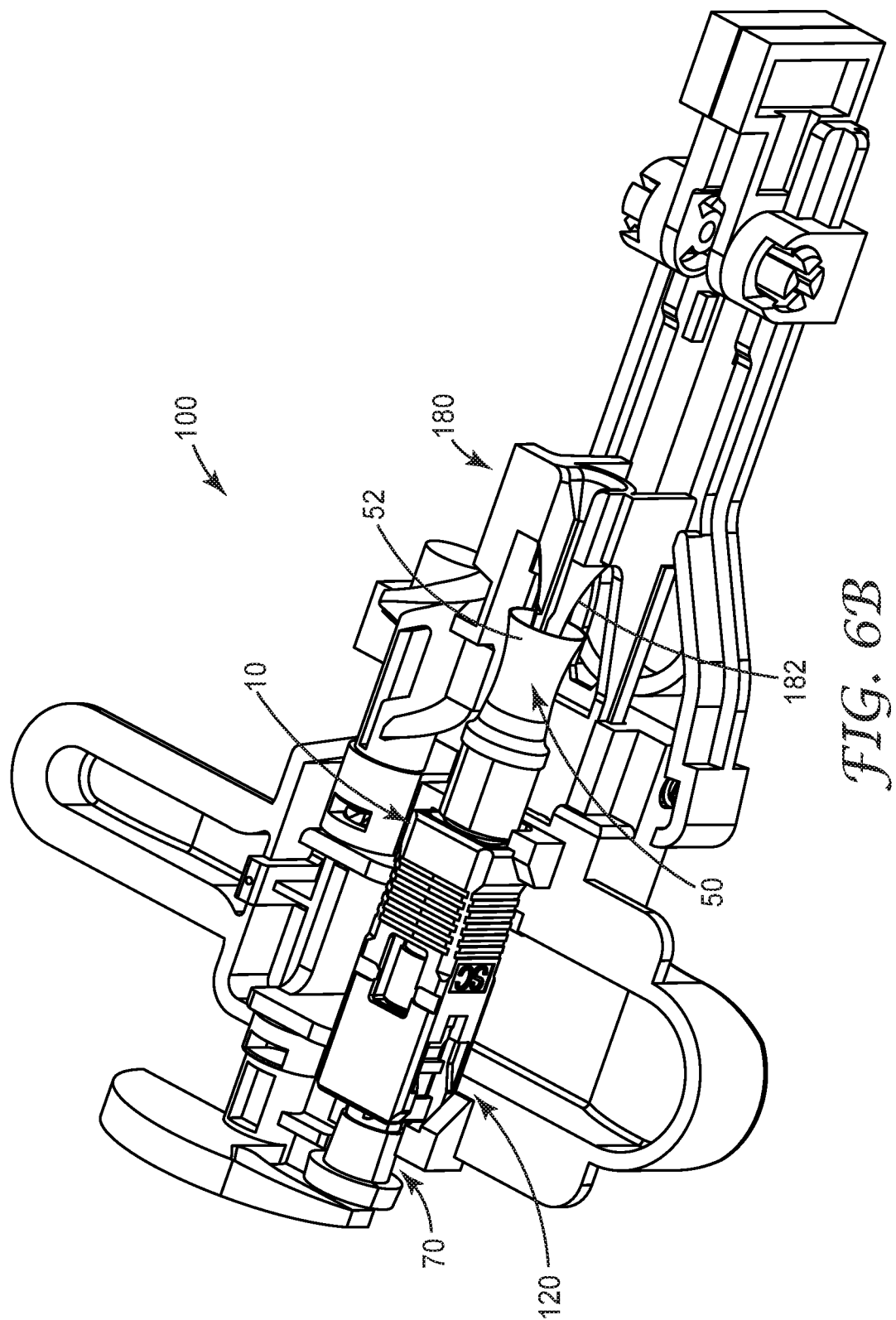

Referring to FIGS. 6A-6E, to begin the termination of an assembled remote grip connector 10 onto an optical fiber 1, optical fiber connector 10 is installed in the assembly tool 100. The funnel-shaped tail section 52 of boot 50 is slipped around tip portion 181 of the funnel-shaped fiber guide 182 by bringing the connector toward the assembly tool boot first, slipping the funnel-like tail portion of the boot over the tip portion of the fiber guide and laying the outer shell 12 of the connector 10 in the connector cradle 120 as shown in FIG. 6B.

Referring to FIG. 6C, an optical fiber 1 can be prepared by stripping and cleaving (flat or angled) to expose the terminal end 4 of the optical fiber 3. The fiber jacket/plastic coating 2 can be stripped using a conventional mechanical fiber stripper to expose the bare glass portion 2 of the optical fiber. The bare glass portion of the fiber can be wiped clean and cleaved, using a conventional cleaver, such as described above, can be performed as the fiber is held in place in the fiber clamp assembly.

Figure 6D:
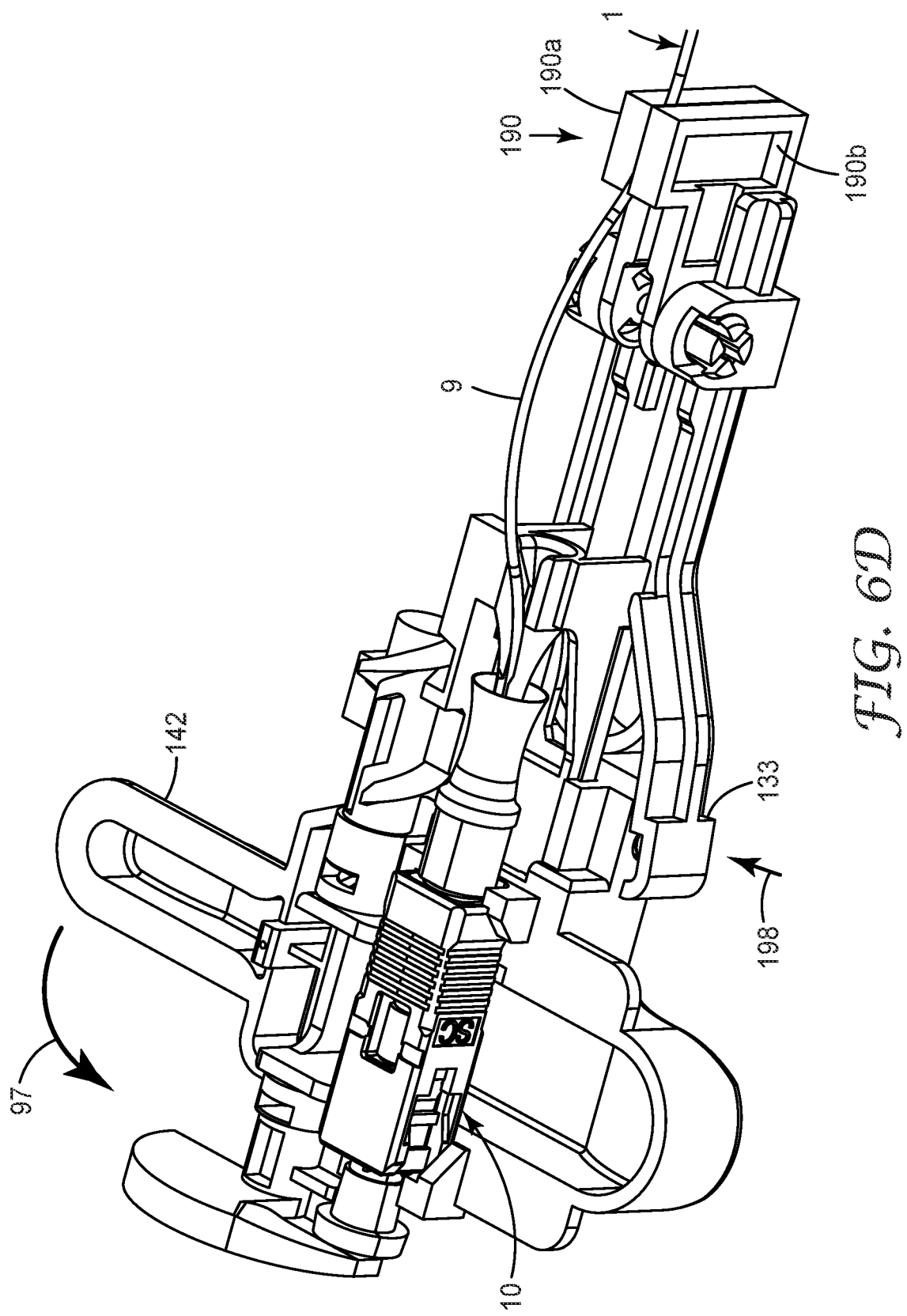
Figure 6E:
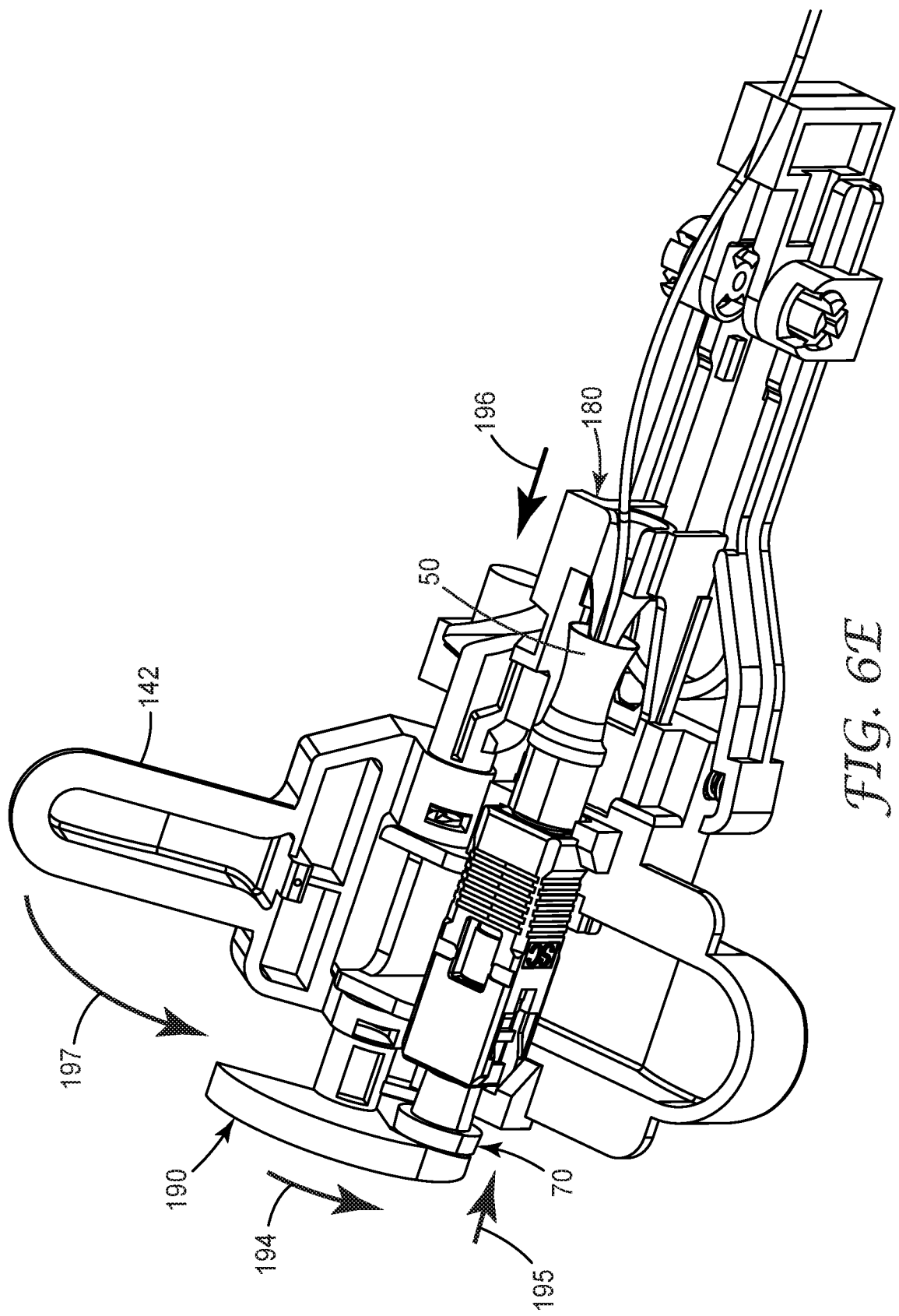
Figure 8A:
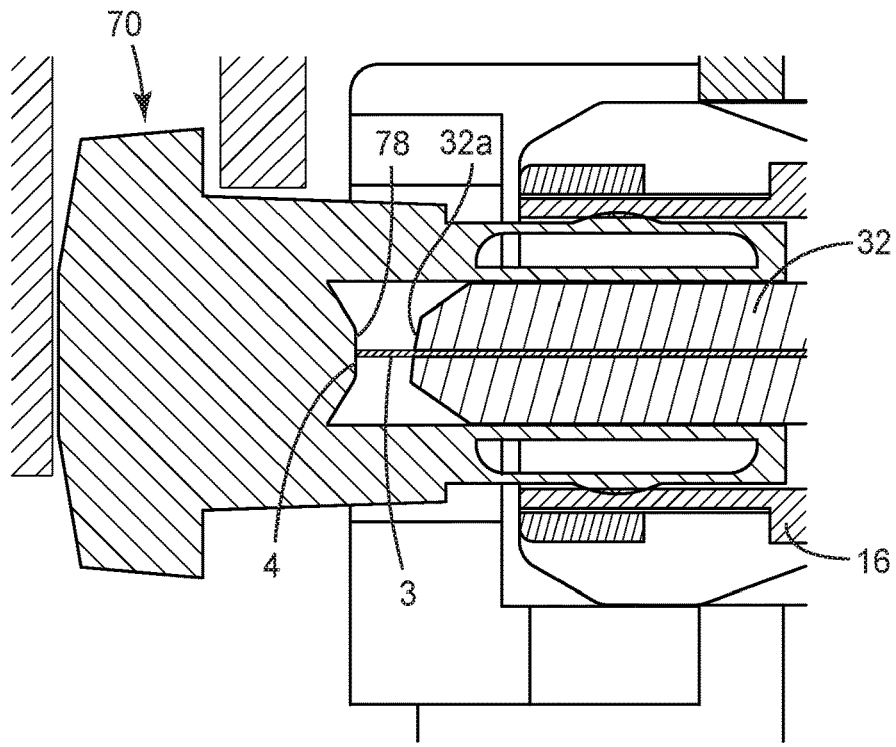
FIGS. 8A and 8B are two cross-sectional detail views illustrating how the fiber protrusion length is set by the exemplary assembly tool according to an exemplary embodiment of the present invention.

The optical fiber 1 is inserted into the second end of connector 10 using the funnel shaped fiber guide 182 to facilitate the insertion as shown in FIG. 6C. The fiber is pushed forward until a portion of the fiber outside of the connector begins to form a fiber bow 9 (FIG. 6D). For a remote grip connector, the fiber bow will begin to form when terminal end 4 of the bare glass portion 3 of optical fiber 1 contacts exposed face 78 inside the bore 76 of the protrusion setting dust cap 70 (see also FIGS. 3B, 7 and 8A). FIG. 7 is a cross section of the assembly tool 100 and connector shown of FIG. 6D and FIG. 8A is a detail cross sectional view inside protrusion setting dust cap 70.

Once a fiber bow 9 has been formed, pressure can be applied to the free end of the clamp lever 133 in a direction of directional arrow 198 to open clamp 190 by separating clamping plates 190a, 190b. The fiber on the far side of the fiber bow is placed between the clamping plates and the clamp closed by releasing the clamp lever as shown in FIG. 6D.

Figure 6F:
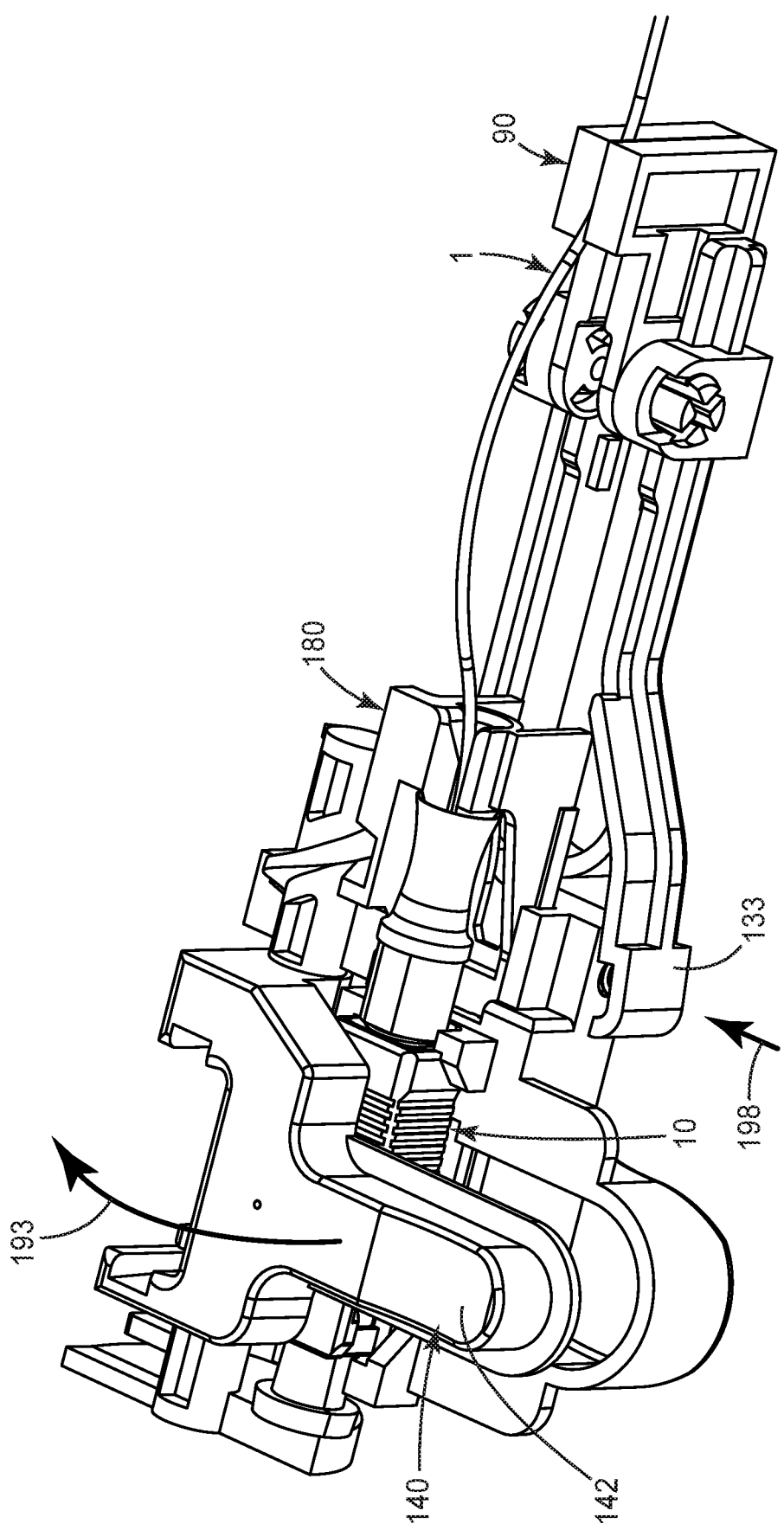
Figure 8B:
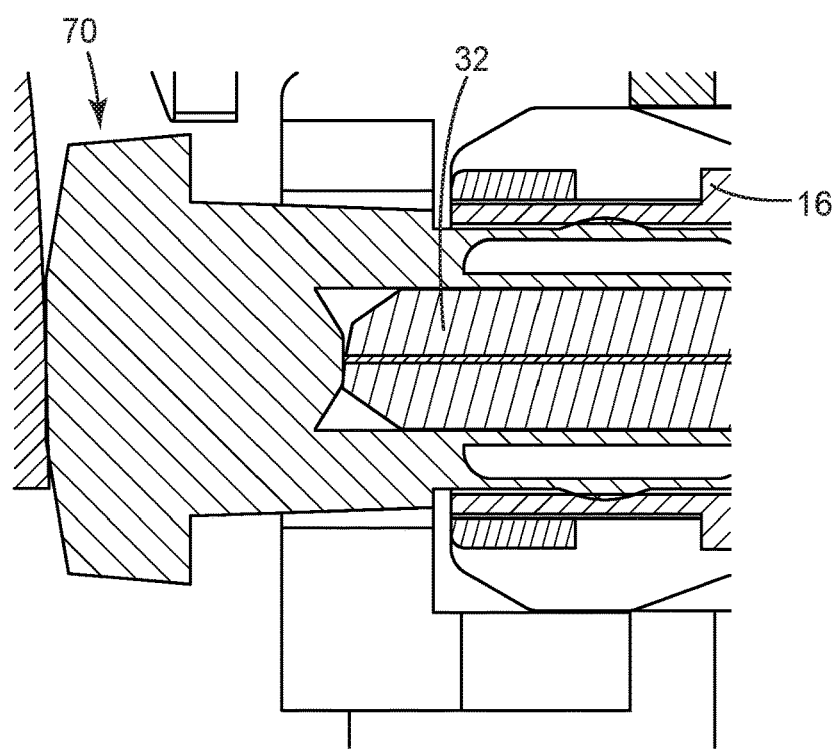
Figure 9A:
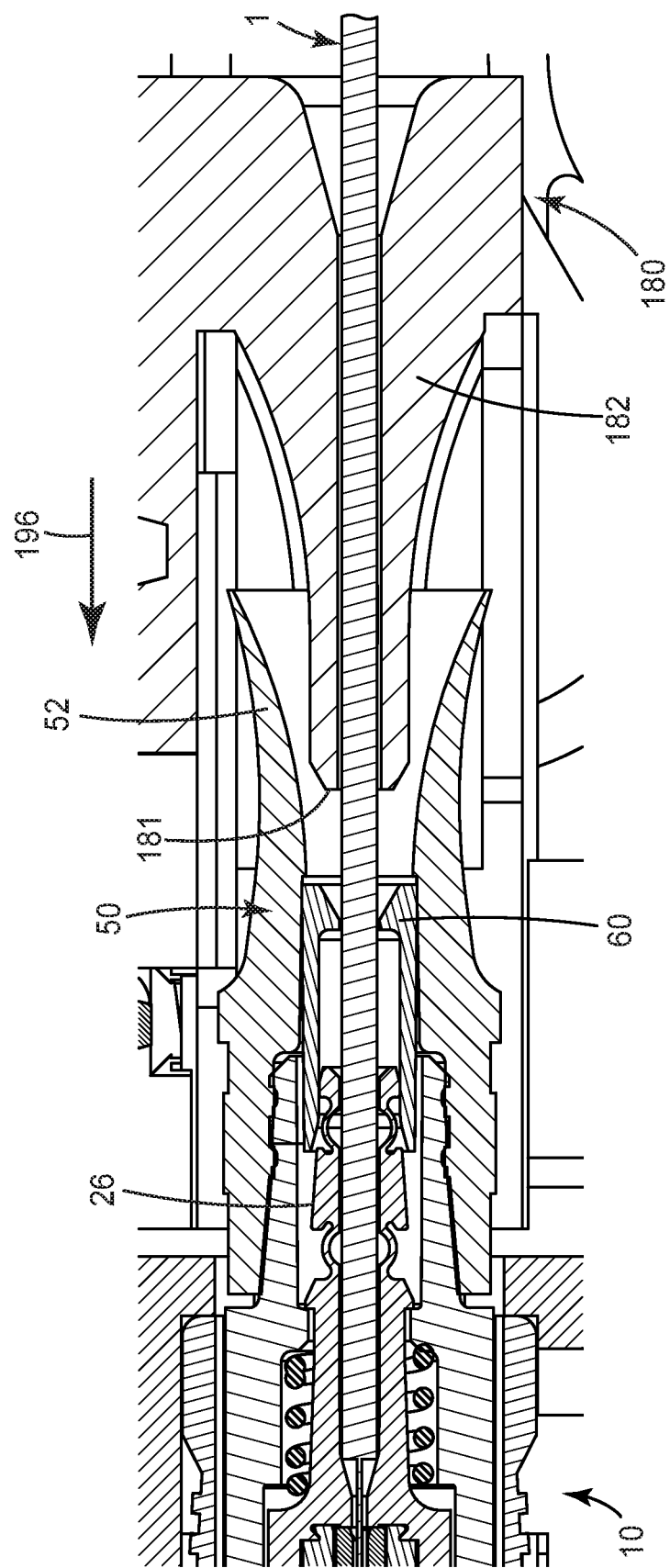
FIGS. 9A and 9B are two cross-sectional detail views illustrating activation of the buffer clamp in an optical fiber connector by the exemplary assembly tool according to an exemplary embodiment of the present invention.
Figure 9B:
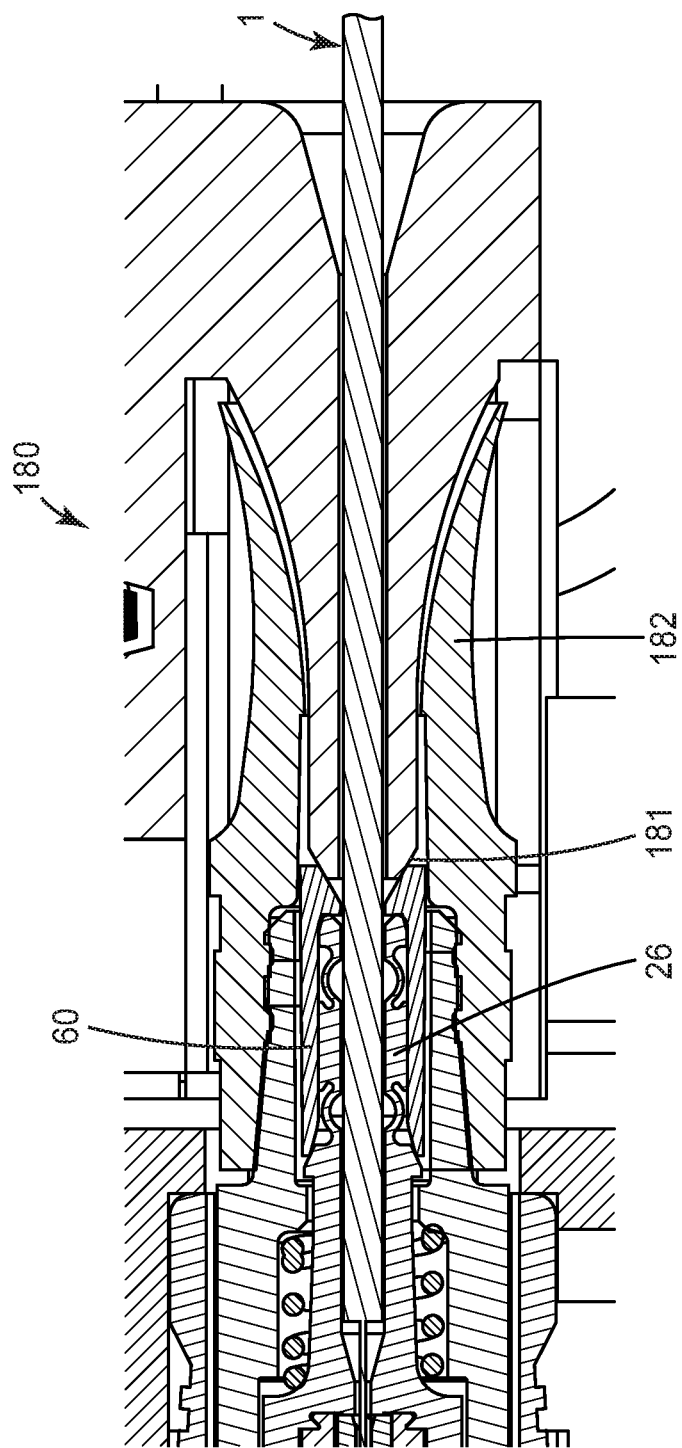

Actuation lever 142 is now moved (as indicated by directional arrow 97) slowly from a first position to a second position. Simultaneously, the buffer clamp activation shuttle begins to move forward, as indicated by directional arrow 196, and the protrusion setting cam 160 begins to rotate as indicated by directional arrow 195 which pushes the protrusion setting dust cap toward the connector ferrule 32, as indicated by directional arrow 195 (see FIGS. 6E and 8B). As the actuation lever continues to move toward the second position, the tip portion of the funnel shaped fiber guide will contact sleeve 60 inside boot 50 and push it forward over buffer clamp 26 causing buffer clamp to exert a holding force on the plastic coating (i.e. the buffer layer) of optical fiber 1 as shown in FIGS. 9A and 9B, where FIG. 9A shows the buffer clamp prior to actuation and FIG. 9B shows the buffer clamp after actuation. When the actuation lever reaches the second position, the force concentrator (not shown) on the bottom side of the actuation lever presses the securing cap over the mechanical element causing it to clamp onto the bare glass portion of the optical fiber extending therethrough. FIG. 6F shows the actuation lever in the second position or the fully actuated connector.

To remove optical fiber 10 from the assembly tool, actuation lever 142 is moved from the second position to the first position by moving as indicated by directional arrow 193. This action moves the buffer clamp activation shuttle 180 back to its original position. The free end of the clamp lever 133 is moved in a direction of directional arrow 198 to open clamp 190 so that the optical fiber can be removed and the bow released. The connector can now be lifted from the assembly tool.

The dust cap 70 can be removed and the connector can be mounted into a field polisher (not shown) so that the fiber tip can be polished. As mentioned above, the fiber will protrude from the front face of the ferrule a distance of from about 5 μm to about 25 μm for UPC and APC after polishing.

Figure 11:
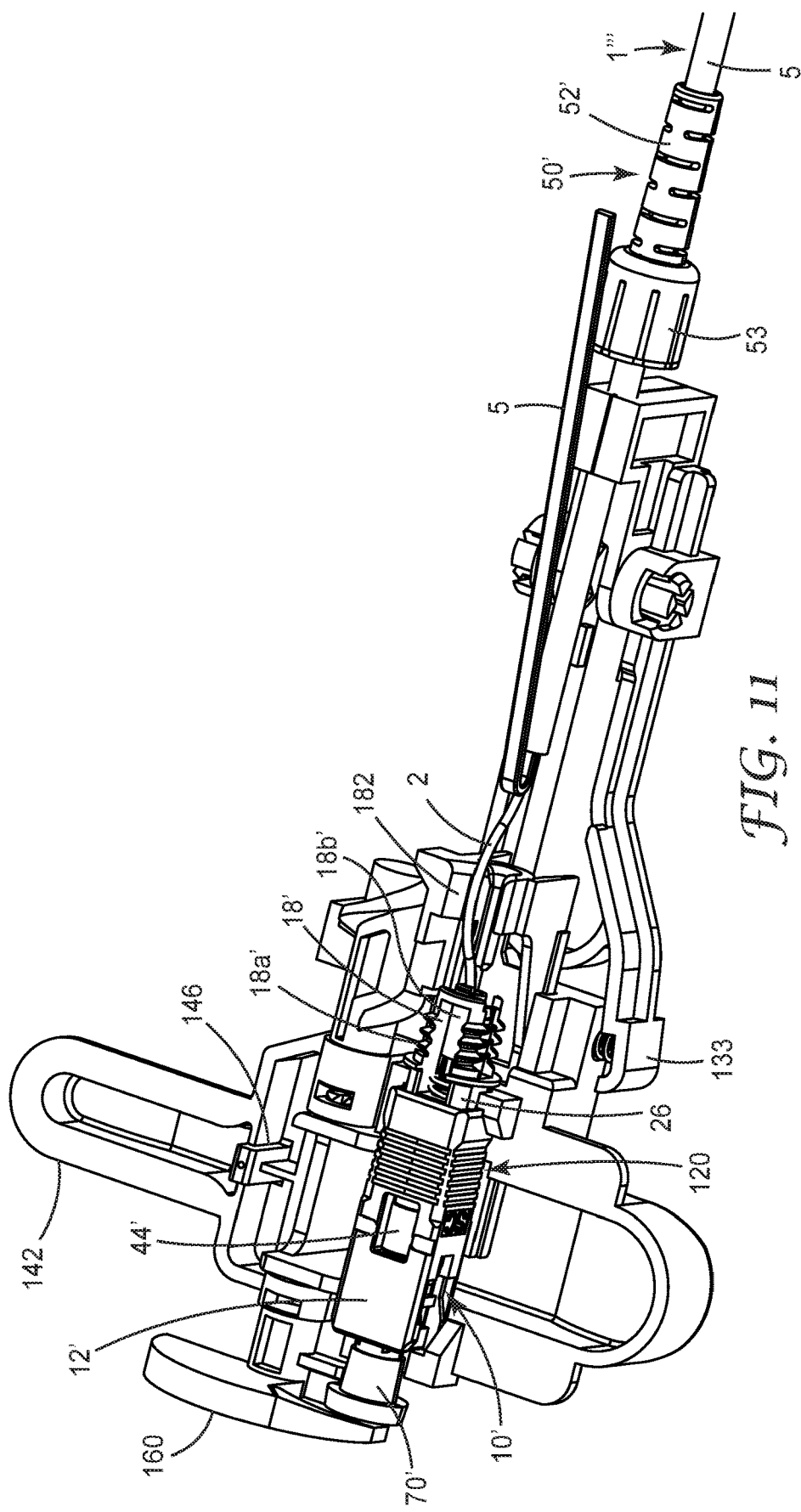
FIG. 11 is an isometric view of an assembly tool being used to terminate an optical fiber drop cable with an optical fiber connector according to an exemplary embodiment of the present invention.

FIG. 11 shows the use of the exemplary assembly tool 100 being used to terminate an optical fiber drop cable 1''' with a partially assembled optical fiber connector 10'. An exemplary optical fiber connector of this type is described in detail in U.S. Pat. No. 9,389,370, incorporated by reference herein in its entirety. In general, optical fiber connector 10' is an SC-type optical fiber connector that include a connector housing and a separate fiber boot 50' to terminate an optical fiber 1 from optical fiber drop cable 1'''. In this exemplary embodiment, housing includes an outer shell 12' configured to be received in an SC receptacle (e.g., an SC coupling, an SC adapter, or an SC socket). A backbone 26' is housed inside the outer shell and provides structural support for optical fiber connector 10'. In addition, the outer shell and backbone further includes at least one access opening 117, which can provide access to actuate a mechanical gripping/splice element disposed within the connector by a securing cap 44', depending on the connector type. A protrusion setting dust cap 70' can also be provided to protect the ferrule end and/or fiber tip.

In one aspect of the invention, the optical connector can be a remote grip connector where the terminated fiber is not adhesively secured in a ferrule. In an alternative aspect of the invention, the optical connector can be a splice type connector having a mechanical splice to splice a field terminated fiber to a fiber stub pre-mounted and secured within a fiber ferrule. Even though the illustrated embodiments of the invention show a remote grip connector, one of ordinary skill in the art given the present description would understand that in an alternative aspect an optical connector can include a mechanical splice device to splice the field fiber to a fiber stub housed in the connector ferrule.

Backbone 26' can further include a mounting section or structure 18' that provides for coupling to the fiber boot 50'. The mounting structure has a plurality of outer threads 18a' disposed on an outer surface thereof to be received within corresponding inner threads (not shown) of boot 50'. In addition, the jacket 5 of the optical fiber cable 1''' can be captured and secured between the mounting structure and the boot of the connector in at least one pocket 18b', wherein the at least one pocket regions is configured to receive a split jacket portion 5'.

Boot 50' is configured to prevent sharp fiber bends at the connector/fiber interface. The boot includes a rotatable nut portion 53' and a tail section 52'. In one aspect, the nut portion and tail section are provided as separate elements, where the tail section is simply inserted through the back end of the nut portion. The tail section has an internal bore (not shown) configured to accommodate the outer diameter of an optical fiber cable 1'''. The tail section can also have a slightly tapered outer diameter. In another aspect, the nut portion and tail section are provided as a single integrated element. The nut portion has a threaded interior surface configured to engage with corresponding outer threads 18a' from mounting section 18'. The tail section has sufficient flexibility to support the fiber minimum bend radius and prevent possible signal losses when the fiber is side-loaded. The nut portion and tail section can be formed from different materials or, alternatively, these elements can be formed of the same material. For example, the tail section can be formed from a material that is more flexible than the material forming the nut portion. If a two part design is utilized, the tail section can be snap fit into back end of the nut portion in the factory or in the field.

In practice, a fiber termination process can utilize the assembly tool 100 to terminate optical fiber cable 1''' in the field to an optical connector 10' in a straightforward manner. In addition, the field technician can utilize an optical connector that is fully assembled or nearly fully assembled in the factory, such that additional connector assembly is not necessary in the field.

An optical fiber, such as optical fiber cable 1''' can be prepared by stripping and cleaving (flat or angled) to expose the terminal end of the optical fiber. The fiber boot 50' can be mounted onto the fiber cable prior to the stripping and cleaving operations. In addition, the outer jacket 5 of the fiber cable can be slit into two jacket portions 5' using a cable cutting or jacket slitting tool. After slitting the cable jacket 5, the jacket portions and strength members (not shown) can be pulled back. After stripping a portion of the fiber buffer 2, using a conventional stripping tool, cleaving, using a conventional cleaver can be performed. Cleaving can be either flat or angled, depending on the application. For example, a commercial fiber cleaver such as an Ilsintech MAX CI-08, available from Ilsintech, Korea (not shown) can be utilized to provide an angled cleave.

The optical fiber is inserted into the second end of connector 10 using the funnel shaped fiber guide 182 to facilitate the insertion as shown in FIG. 11. The fiber is pushed forward until a portion of the fiber outside of the connector begins to form a fiber bow as describe previously.

Once a fiber bow has been formed, pressure can be applied to the free end of the clamp lever 133 in a direction of directional arrow 198 to open clamp 190 by separating clamping plates, 190*b*. The optical fiber on the far side of the fiber bow from the connector is placed between the clamping plates and the clamp closed by releasing the clamp lever.

Actuation lever 142 is now moved slowly from a first position to a second position. Simultaneously, the buffer clamp activation shuttle begins to move forward and the protrusion setting cam 160 begins to rotate which pushes the protrusion setting dust cap toward the connector ferrule. As the actuation lever continues to move toward the second position, the tip portion of the funnel shaped fiber guide will contact a buffer clamp sleeve and push it forward over buffer clamp causing buffer clamp to exert a holding force on the plastic coating (i.e. the buffer layer) of optical fiber. When the actuation lever reaches the second position, the force concentrator 146 on the bottom side of the actuation lever presses the securing cap 44 over the mechanical element within the connector causing it to clamp onto the bare glass portion of the optical fiber extending therethrough. The actuation lever is then moved from the second position to the first position and optical fiber connector 10' removed from the assembly tool.

The strength members can then be removed from their tucked position and pulled forward over the mounting structure. Excess slit jacket portions 5' can also be removed, leaving an amount suitable to be placed in pockets 18*b*'. The nut portion 53' of the boot 50' can be brought towards mounting structure 18' and rotated onto the mounting structure, thus capturing the strength members and jacket portions underneath. Excess strength members can be removed/cut off when the nut portion of the boot is completely mounted onto the mounting section.

The dust cap 70' can be removed and the connector can be mounted into a field polisher (not shown) so that the fiber tip can be polished. As mentioned above, the fiber will protrude from the front face of the ferrule a distance of from about 5 µm to about 25 µm for UPC and APC after polishing.

The exemplary assembly tool of the embodiments described herein provides a low cost, reliable means for terminating an optical fiber with an optical fiber connector. In addition, the ability to precisely set the length of fiber protruding from the end of the ferrule enables the use of a simple one-step finishing operation, if desired. The exemplary tool simplifies the termination procedure for mounting an optical fiber connector on the terminal end of an optical fiber by eliminating the need for the field technician to remember a many step termination process. The tool ensures that the steps taken to secure the optical fiber in the connector happen in the correct and same order every time yielding more consistent results. In addition the simplified process is more intuitive, faster, and will require less time to train new field technicians. The exemplary assembly tool can be used with a variety of connectors as well as cable types ranging from 0.25 mm to about 6.0 mm in diameter for round or oval cables, or up to about a 8.3 mm by 4.5 mm rectangular optical fiber drop cables.

Although the present invention has been described with reference to the preferred embodiments disclosed herein, workers skilled in the art will recognize that changes may be made in form and detail without departing from the scope of the invention.

What is claimed is:

1. An assembly tool for terminating an optical fiber with an optical fiber connector, comprising:
   a base having a connector cradle disposed near a first end thereof to hold the optical fiber connector while the optical fiber is terminated by the assembly tool;
   a buffer clamp activation shuttle slidably disposed on the base, wherein the buffer clamp activation shuttle is configured to push a sleeve over a buffer clamp of the optical fiber connector, wherein the buffer clamp is configured to clamp onto a buffer portion of the optical fiber; and
   an activation mechanism pivotally mounted to the base, the activation mechanism comprising:
      an actuation lever to press a securing cap over a mechanical element disposed within the optical fiber connector; and
      a drive shaft coupled to the actuation lever, wherein the drive shaft is configured to rotate about an axis that is parallel to the optical fiber while the optical fiber is terminated by the assembly tool,
   wherein a single continuous movement of the actuation lever from a first position to a second position causes (i) the drive shaft to move the buffer clamp activation shuttle to activate the buffer clamp, and (ii) the actuation lever to press the securing cap over the mechanical element.

2. The assembly tool of claim 1, wherein the actuation lever rotates around the axis that is parallel to the optical fiber while the optical fiber is terminated by the assembly tool.

3. The assembly tool of claim 1, being configured to cause the buffer clamp activation shuttle to push the sleeve over the buffer clamp before the securing cap is pressed by the actuation lever.

4. The assembly tool of claim 1, being configured to cause the actuation lever to press the securing cap before the buffer clamp activation shuttle pushes the sleeve over the buffer clamp.

5. The assembly tool of claim 1, wherein the activation mechanism further comprises a protrusion setting cam configured to set a protrusion of a terminal end of the optical fiber, the protrusion corresponding to a distance that the terminal end of the optical fiber extends from an end face of a ferrule of the connector.

6. The assembly tool of claim 5, wherein the protrusion setting cam is activated by the movement of the actuation lever.

7. The assembly tool of claim 5, being configured to activate the protrusion setting cam before: (i) the sleeve is pushed over the buffer clamp and (ii) the securing cap is pressed over the mechanical element.

8. The assembly tool of claim 1, further comprising an optical fiber clamp disposed at a second end of the base.

9. The assembly tool of claim 8, wherein the optical fiber clamp comprises a pair of clamping plates and a clamp lever configured to open and close the pair of clamping plates.

10. The assembly tool of claim 9, wherein the clamp lever is spring loaded in a closed position, wherein the clamp lever is depressed to open the pair of clamping plates.

11. The assembly tool of claim 8, wherein the optical fiber clamp is removably attached to the base.

12. The assembly tool of claim 8, wherein the optical fiber clamp is rotatably connected to the base in a direction that is about an axis that is perpendicular to the optical fiber while the optical fiber is terminated by the assembly tool.

13. The assembly tool of claim 1, wherein the buffer clamp activation shuttle includes a funnel-shaped fiber guide configured to facilitate insertion of the optical fiber into the optical fiber connector.

14. The assembly tool of claim 1, wherein a threaded feature extends from an outer surface of the drive shaft, and the threaded feature is configured to cooperate with a helical trench formed in a surface of a drive block of the buffer clamp activation shuttle to effectuate movement of the buffer clamp actuation shuttle upon rotation of the drive shaft.

15. A method of terminating an optical fiber with an optical fiber connector having a first end that includes a connector ferrule and a second end using the assembly tool according to claim 1, the method comprising:
- inserting the optical fiber connector into the connector cradle;
- inserting an optical fiber into the second end of the optical fiber connector until a portion of the optical fiber outside of the optical fiber connector begins to bow; and
- moving the actuation lever from the first position to the second position to: (i) move the buffer clamp activation shuttle to actuate the buffer clamp, and (ii) press the securing cap over the mechanical element within the optical fiber connector.

16. The method of claim 15, wherein moving the actuation lever from the first position to the second position moves the buffer clamp activation shuttle and presses the securing cap over the mechanical element in sequential order.

17. The method of claim 15, wherein the securing cap is pressed over the mechanical element before the buffer clamp activation shuttle is moved.

18. The method of claim 15, wherein the activation mechanism further comprises a protrusion setting cam configured to set a protrusion of a terminal end of the optical fiber from an end face of the connector ferrule.

19. The method of claim 18, wherein the protrusion setting cam is activated by the movement of the actuation lever before the securing cap is pressed over the mechanical element and before the buffer clamp activation shuttle is moved.

20. The method of claim 18, wherein the optical fiber connector includes a protrusion setting dust cap disposed over the connector ferrule.

21. The method of claim 20, wherein activation of the protrusion setting cam pushes the protrusion setting dust cap toward the second end of the optical fiber connector so that the terminal end of the optical fiber extends from the end face of the connector ferrule by a distance in a range of between 8 microns and 42 microns.

22. The method of claim 15, further comprising clamping the bowed optical fiber in a fiber clamp arranged at a second end of the base.

* * * * *